United States Patent
Kim et al.

(10) Patent No.: US 9,622,174 B2
(45) Date of Patent: Apr. 11, 2017

(54) METHOD AND APPARATUS FOR USING A PLURALITY OF CELLS IN COMMUNICATION SYSTEM

(71) Applicant: Samsung Electronics Co., Ltd., Gyeonggi-do (KR)

(72) Inventors: Young-Bum Kim, Seoul (KR); Ju-Ho Lee, Gyeonggi-do (KR); Joon-Young Cho, Gyeonggi-do (KR); Seung-Hoon Choi, Gyeonggi-do (KR); Sang-Min Ro, Seoul (KR); Hyoung-Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 14/036,690

(22) Filed: Sep. 25, 2013

(65) Prior Publication Data

US 2014/0086127 A1 Mar. 27, 2014

(30) Foreign Application Priority Data

Sep. 25, 2012 (KR) ........................ 10-2012-0106684

(51) Int. Cl.
*H04W 4/00* (2009.01)
*H04W 52/02* (2009.01)
*H04L 5/00* (2006.01)

(52) U.S. Cl.
CPC ........ *H04W 52/0212* (2013.01); *H04L 5/001* (2013.01); *H04L 5/0035* (2013.01)

(58) Field of Classification Search
CPC . H04W 52/04; H04W 52/34; H04W 52/0206; H04W 72/0473; H04L 5/0035; H04B 7/024; H04B 7/0413
See application file for complete search history.

(56) References Cited

U.S. PATENT DOCUMENTS

2010/0034171 A1* 2/2010 Pelletier ............ H04W 36/0055 370/331
2010/0034176 A1* 2/2010 Heo et al. ..................... 370/335
(Continued)

FOREIGN PATENT DOCUMENTS

| EP | 2 323 304 | 5/2011 |
|---|---|---|
| EP | 2 389 026 | 11/2011 |
| WO | WO 2011/155763 | 12/2011 |

OTHER PUBLICATIONS

Nokia Siemens Networks, Nokia, "Cell Aggregation: A Unified Approach to CoMP and Carrier Aggregation", R1-111737, 3GPP TSG-RAN WG1 Meeting #65, May 3, 2011.
(Continued)

*Primary Examiner* — Derrick Ferris
*Assistant Examiner* — Ryan Kavleski
(74) *Attorney, Agent, or Firm* — The Farrell Law Firm, P.C.

(57) ABSTRACT

Methods and apparatus for using a plurality of cells by an evolved NodeB (eNB) in a communication system are provided. A first eNB, which manages a first cell and is providing a communication service to a User Equipment (UE) located in the first cell, determines to provide the communication service to the UE together with a second cell of a second eNB, which neighbors the UE. A cell addition request message, making a request for aggregation of the first cell and the second cell, is transmitted to the second eNB to provide the communication service. When a cell addition response message, accepting the request for aggregation of the first cell and the second cell, is received from the second eNB, a cell activation request message, making a request for activation of the second cell, is transmitted to the second eNB.

32 Claims, 13 Drawing Sheets

(56) References Cited

U.S. PATENT DOCUMENTS

| | | | |
|---|---|---|---|
| 2012/0014357 A1* | 1/2012 | Jung | H04L 5/0035 370/332 |
| 2012/0113839 A1 | 5/2012 | Etemad | |
| 2012/0113848 A1* | 5/2012 | Kim et al. | 370/252 |
| 2012/0113951 A1 | 5/2012 | Koo et al. | |
| 2012/0213207 A1* | 8/2012 | Jang et al. | 370/336 |
| 2013/0012186 A1* | 1/2013 | Kim | H04L 5/003 455/418 |
| 2013/0058307 A1 | 3/2013 | Kim et al. | |
| 2013/0128829 A1* | 5/2013 | Sebire | 370/329 |
| 2013/0279433 A1* | 10/2013 | Dinan | 370/329 |
| 2014/0023055 A1* | 1/2014 | Jeong et al. | 370/336 |
| 2014/0029514 A1* | 1/2014 | Yu | H04W 24/10 370/328 |
| 2014/0036879 A1* | 2/2014 | Pirskanen | 370/336 |
| 2014/0056243 A1* | 2/2014 | Pelletier | H04W 74/04 370/329 |
| 2015/0215926 A1* | 7/2015 | Huang | H04W 36/0061 370/329 |

OTHER PUBLICATIONS

Qualcomm Incorporated, "Clarification of SCell Activation/Deactivation Command Timeline", R2-122409, 3GPP TSG-RAN2 Meeting #78, May 21, 2012.

Qualcomm Incorporated, "Dynamic Activation and De-Activation of Secondary Cells During Carrier Aggregation", R2-120306, 3GPP TSG-RAN WG2 #77, Feb. 6, 2012.

ZTE, "Procedure of (De-)Activation and DTX/DRX for Multiflow Operation", R1-121707, 3GPP TSG RAN WG1 Meeting #68bis, Mar. 26, 2012.

* cited by examiner

METHOD AND APPARATUS FOR USING A PLURALITY OF CELLS IN COMMUNICATION SYSTEM

PRIORITY

This application claims priority under 35 U.S.C. §119(a) to Korean Application Serial No. 10-2012-0106684, which was filed in the Korean Intellectual Property Office on Sep. 25, 2012 the entire content of which is incorporated herein by reference.

BACKGROUND OF THE INVENTION

1. Field of the Invention

The present invention relates to a method and an apparatus for using a plurality of cells in a communication system supporting carrier aggregation between different evolved Node Bs (eNBs).

2. Description of the Related Art

Wireless communication systems have been developed that provide a high speed and high quality packet data service for communication standards such as, for example, High Speed Packet Access (HSPA) of 3rd Generation Partnership Project (3GPP), Long Term Evolution (LTE), High Rate Packet Data (HRPD) of 3GPP2, Ultra Mobile Broadband (UMB), and Institute of Electrical and Electronics Engineers (IEEE) 802.16e.

In an LTE system, a DownLink (DL) adopts an Orthogonal Frequency Division Multiplexing (OFDM) scheme and an UpLink (UP) adopts a Single Carrier Frequency Division Multiple Access (SC-FDMA) scheme. The multiple access scheme helps distinguish data or control information for each user by providing time-frequency resources, which carry data or control information for each user, that do not overlap each other. Specifically, the time-frequency resources are allocated and operated to achieve orthogonality.

Further, the LTE system adopts a Hybrid Automatic Repeat request (HARQ) scheme in which a physical layer re-transmits corresponding data when a decoding failure occurs in an initial transmission. In the HARQ scheme, when a receiver does not accurately decode data, the receiver transmits information (Non-ACKnowledgement: NACK) informing a transmitter of a decoding failure. Thus, the transmitter may re-transmit the corresponding data through a physical layer. Further, the receiver may increase a data reception capability by combining existing data of which the decoding has failed and data re-transmitted by the transmitter. When the receiver accurately decodes data, the receiver transmits information (ACKnowledgement: ACK) informing the transmitter of a decoding success. Thus, the transmitter may transmit new data.

In providing a high speed wireless data server in a broadband wireless communication system, support of a scalable bandwidth is of significant importance. For example, the LTE system may support various bandwidths such as, for example, 20/15/10/5/3/1.4 MHz. Accordingly, service providers may select a particular bandwidth from the various bandwidths to provide a service. There are various kinds of terminals that may support a maximum bandwidth of 20 MHz and support only a minimum bandwidth of 1.4 MHz.

An LTE-Advanced (LTE-A) system, which aims to provide a service in a level of International Mobile Telecommunication (IMT)-Advanced demands, may provide a broadband service over a maximum bandwidth of 100 MHz through carrier aggregation between LTE carriers. For high speed data transmission, the LTE-A system requires wider bands than the LTE system, and terminals should receive a service through an access to the LTE-A system based on an importance of backward compatibility between the terminals. Accordingly, the LTE-A system divides an entire system band into subbands of the bandwidth, or Component Carriers (CCs), which can be transmitted or received by the terminal, and combines predetermined CCs. Further, the LTE-A system may generate and transmit data for each CC, and support high speed data transmission of the LTE-A through a transmission/reception process of the conventional LTE system used for each CC.

FIG. 1 is a diagram illustrating carrier aggregation in a general LTE-A system.

A configuration of FIG. 1 can be applied to uplink carrier aggregation as well as downlink carrier aggregation. An uplink refers to a wireless link in which a User Equipment (UE) 108 transmits data or a control signal to an eNB 102. A downlink refers to a wireless link in which the eNB 102 transmits data or a control signal to the UE 108.

Referring to FIG. 1, the eNB 102 supports aggregation of two CCs, CC#1 and CC#2. CC#1 includes a frequency f1, and CC#2 includes a frequency f2, which is different from the frequency f1. CC#1 and CC#2 may be operated by the same eNB 102, and the eNB 102 may provide coverages 104 and 106 corresponding to the component carriers. In the LTE-A system supporting the carrier aggregation, data transmission and control information transmission supporting the data transmission are basically performed for each CC.

Among the CCs included in the carrier aggregation, a CC that corresponds to a reference is called a primary carrier or a Primary Component Carrier (PCC), and a CC that is not the primary carrier is called a secondary carrier, a Secondary Component Carrier (SCC), or a non-primary CC. Information on a CC set and operated as the primary carrier, and information on the number of CCs to be aggregated are provided to the UE 108 by the eNB 102 through signaling.

In the downlink, a CC set as the primary carrier transmits initial system information or higher signaling, and may become a reference CC that controls mobility of the UE. In the uplink, a CC transmitting HARQ ACK/NACK for data received by the UE 108, or a control channel signal including a Channel Status indicator (CSI) indicating a status of a channel between the eNB 102 and the UE 108, may become the primary carrier. A cell including the downlink primary carrier and the uplink primary carrier is called a primary cell or a Pcell, and a cell including the downlink secondary carrier and the uplink secondary carrier is called a secondary cell or an Scell.

Further, in the carrier aggregation, there are two possible carrier aggregations, which include a symmetric carrier aggregation in which numbers of aggregated uplink CCs and downlink CCs are the same, and an asymmetric carrier aggregation in which numbers of aggregated uplink CCs and downlink CCs are different.

As described above, in the LTE-A system, the data is generated and transmitted for each CC, and scheduling information on the data transmitted for each CC is provided to the UE as Downlink Control Information (DCI). The DCI may be defined in various formats. Specifically, a DCI format is predetermined according to whether the DCI is an uplink grant (UL grant), which includes scheduling information on uplink data, or a downlink grant (DL grant), which includes scheduling information on downlink data, whether the DCI is a compact DCI having a small size of control information, whether the DCI applies spatial multiplexing using multiple antennas, and whether the DCI controls power. The predetermined format is applied and operated.

For example, DCI format 1, which is the DL grant including the scheduling information on the downlink data, includes the following control information.

Resource allocation type 0/1 flag: informs whether a resource allocation scheme corresponds to type 0 or type 1. Type 0 applies a bitmap scheme to allocate resources in units of Resource Block Groups (RBGs). A basic unit of the scheduling in the LTE and LTE-A systems is a Resource Block (RB) expressed by time and frequency domain resources. The RBG consists of a plurality of RBs and becomes a basic unit of scheduling in type 0. Type 1 allocates a particular RB within the RBG.

Resource block assignment: informs of RBs allocated for data transmission. Expressing resources are determined according to a system bandwidth and a resource allocation scheme.

Modulation and coding scheme: informs of a modulation scheme and a coding scheme used for data transmission.

HARQ process number: informs of a process number of HARQ.

New data indicator: informs whether HARQ transmission is an initial transmission or a re-transmission.

Redundancy version: informs of a redundancy version of HARQ.

TPC command for Physical Uplink Control Channel (PUCCH): informs of a Transmission Power Control (TPC) command for a PUCCH corresponding to an uplink control channel.

The DCI is transmitted through a Physical Downlink Control Channel (PDCCH) corresponding to a downlink physical control channel via a channel coding and modulation process.

FIG. 2 is a diagram illustrating scheduling operations of the eNB and the UE according carrier aggregation in the general LET-A system.

Referring to FIG. 2, DCI 201 transmitted through CC#1 209 is channel-coded and interleaved after an application of a format defined in the LTE-A system, and then generates a PDCCH 203 signal. The PDCCH 203 signal includes scheduling information on a Physical Downlink Shared Channel (PDSCH) 213 corresponding to a data channel allocated to the UE 108 in CC#1 209 and transmitted to the UE 108. Further, DCI 205 transmitted through CC#2 211 is channel-coded and interleaved after an application of a format defined in the LTE system, and then generates a PDCCH 207 signal. The PDCCH 207 signal includes scheduling information on a PDSCH 215 corresponding to a data channel allocated to the UE 108 in CC#2 211 and transmitted to the UE 108.

In an LTE-A system, in order to reduce unnecessary power consumption of the UE 108, each CC or cell may be activated or deactivated. Specifically, when there is no data to be transmitted through a downlink or an uplink, the eNB 102 allows the UE 108 to deactivate the corresponding CC or cell, and thus a transmission/reception operation of the UE 108 in the corresponding CC or cell is limited. Accordingly, unnecessary power consumption is reduced. Further, when data to be transmitted to the corresponding CC or cell is generated, the corresponding CC or cell is quickly activated, so that a transmission delay can be minimized and a system efficiency can be increased.

SUMMARY OF THE INVENTION

The present invention has been made to address at least the above problems and/or disadvantages and to provide at least the advantages described below. Accordingly, an aspect of the present invention provides a method and an apparatus for using CCs or cells in order to increase a system efficiency in a communication system.

Another aspect of the present invention provides a method and an apparatus for activating or deactivating CCs or cells in a communication system supporting carrier aggregation between different eNBs.

In accordance with an aspect of the present invention, a method of using a plurality of cells by an eNB in a communication system is provided. TA first eNB, which manages a first cell and is providing a communication service to a UE located in the first cell, determines to provide the communication service to the UE together with a second cell of a second eNB, which neighbors the UE. A cell addition request message, making a request for aggregation of the first cell and the second cell, is transmitted to the second eNB to provide the communication service. When a cell addition response message, accepting the request for aggregation of the first cell and the second cell, is received from the second eNB, a cell activation request message, making a request for activation of the second cell, is transmitted to the second eNB.

In accordance with another aspect of the present invention, a method of using a plurality of cells by an eNB in a communication system is provided. The eNB receives, from a first eNB, which manages a first cell and is providing a communication service to a UE located in the first cell, a cell addition request message, making a request for aggregation of the first cell and a second cell of a second eNB, which neighbors the UE, to provide the communication service. The eNB transmits a cell addition response message, accepting the request for aggregation of the first cell and the second cell, to the first eNB. The eNB receives a cell activation request message, making a request for activation of the second cell, from the first eNB.

In accordance with another aspect of the present invention, a method of using a plurality of cells by a UE in a communication system is provided. When a first eNB, which manages a first cell and is providing a communication service to the UE located in the first cell, determines to provide the communication service to the UE together with a second cell of a second eNB, which neighbors the UE, the UE receives a Radio Resource control (RRC) connection reconfiguration message, comprising related information required for aggregation of the first cell and the second cell, from the first eNB. The UE transmits an RRC connection reconfiguration complete message, indicating that preparation for communication with the second cell has been completed, to the first eNB. The UE receives an activation command of the second cell from the first eNB.

In accordance with another aspect of the present invention, an eNB using a plurality of cells in a communication system is provided. The eNB includes a carrier aggregation determiner that determines that the eNB, which manages a first cell and is providing a communication service to a UE located in the first cell, is to provides the communication service to the UE together with a second cell of a second eNB, which neighbors the UE. The eNB also includes a transmitter that transmits a cell addition request message, making a request for aggregation of the first cell and the second cell, to the second eNB, to provide the communication service and, when a cell addition response message, accepting the request for aggregation of the first cell and the second cell is received from the second eNB, transmits a cell activation request message, making a request for activation of the second cell to the second eNB.

In accordance with another aspect of the present invention, an eNB using a plurality of cells in a communication system is provided. The eNB includes a receiver that receives, from a first eNB, which manages a first cell and is providing a communication service to a UE located in the first cell, a cell addition request message, making a request for aggregation of the first cell and a second cell of the eNB, which neighbors the UE, to provide the communication service, and receives a cell activation request message, making a request for activation of the second cell, from the first eNB. The eNB also includes a carrer aggregation determiner that determines whether to accept the request for aggregation of the first cell and the second cell. The eNB further includes a transmitter that transmits a cell addition response message, accepting the request for aggregating the cells, to the first eNB.

In accordance with another aspect of the present invention, a UE using a plurality of cells in a communication system is provided. The UE includes a receiver that, when a first eNB, which manages a first cell and is providing a communication service to the UE located in the first cell, determines to provide the communication service to the UE together with a second cell of a second eNB, which neighbors the UE, receives an RRC connection reconfiguration message, comprising related information required for aggregation of the first cell and the second cell, from the first eNB, and receives an activation command of the second cell from the first eNB. The UE also includes a transmitter that transmits an RRC connection reconfiguration complete message, indicating that a preparation for communication with the second cell has been completed, to the first eNB.

BRIEF DESCRIPTION OF THE DRAWINGS

The above and other aspects, features, and advantages of the present invention will be more apparent from the following detailed description when taken in conjunction with the accompanying drawings, in which.

Figure 1:
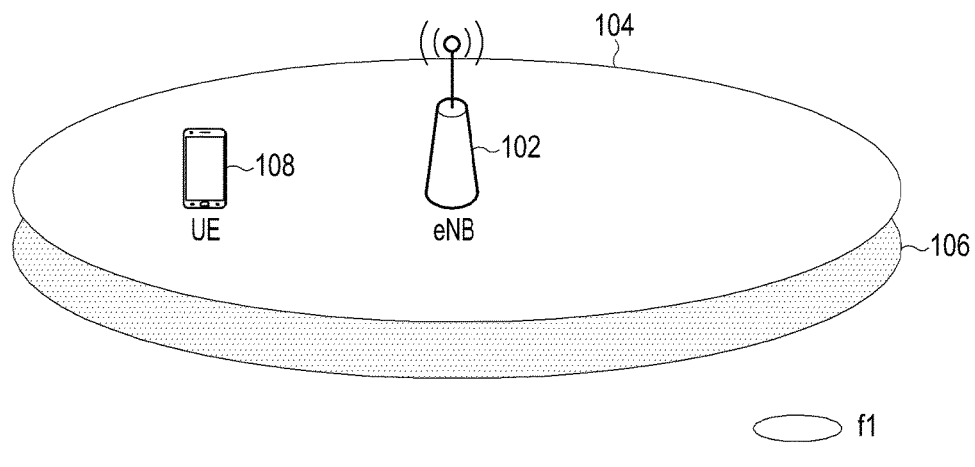
FIG. 1 is a diagram illustrating carrier aggregation in a general LTE-A system.
Figure 2:
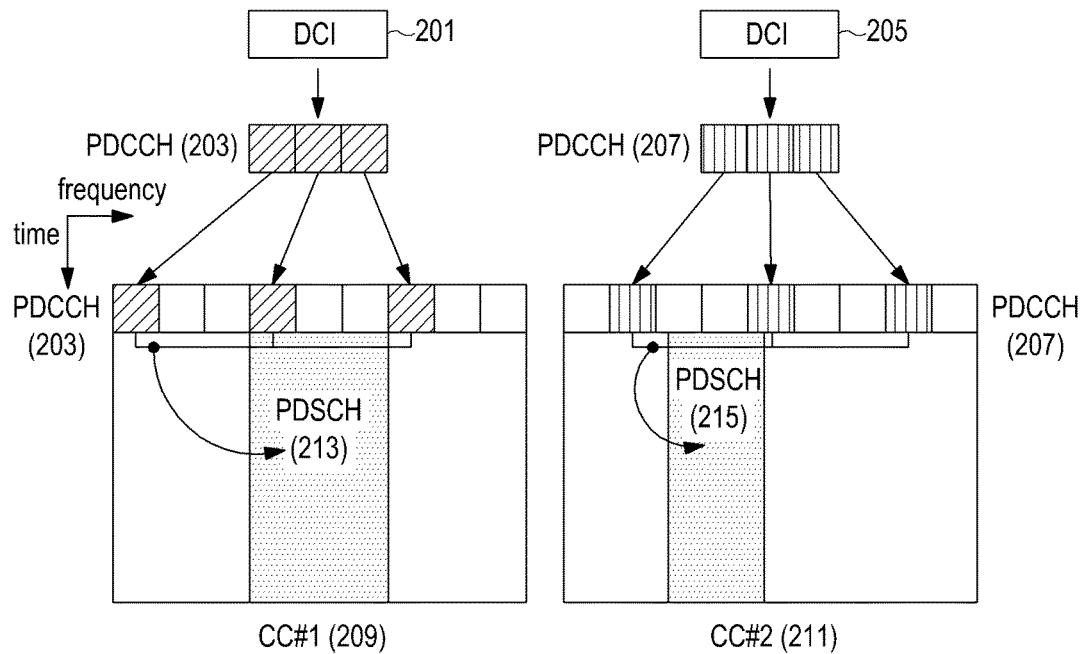
FIG. 2 is a diagram illustrating scheduling operations of an eNB and a UE according carrier aggregation in a general LET-A system.

DETAILED DESCRIPTION OF EMBODIMENTS
OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Hereinafter, an eNB is a subject that allocates resources to UEs and may be one of an eNode B, an eNB, a Node B, a Base Station (BS), a radio access unit, a base station controller, and a node on the network. Further, a UE may be one of a UE, a Mobile Station (MS), a cellular phone, a smart phone, a computer, and a multimedia system capable of performing a communication function.

Although an embodiment of the present invention describes the LTE-A system supporting carrier aggregation as an example, embodiments of the present invention may be applied to different communication systems having a similar technical background and/or channel form.

Further, embodiments of the present invention may be modified by those skilled in the art without departing from the scope of the present invention, and the modified embodiments may be applied to different communication systems. For example, a transmission/reception method, according to embodiment of the present invention, may be applied to a multicarrier HSPA system supporting carrier aggregation.

Figure 3:
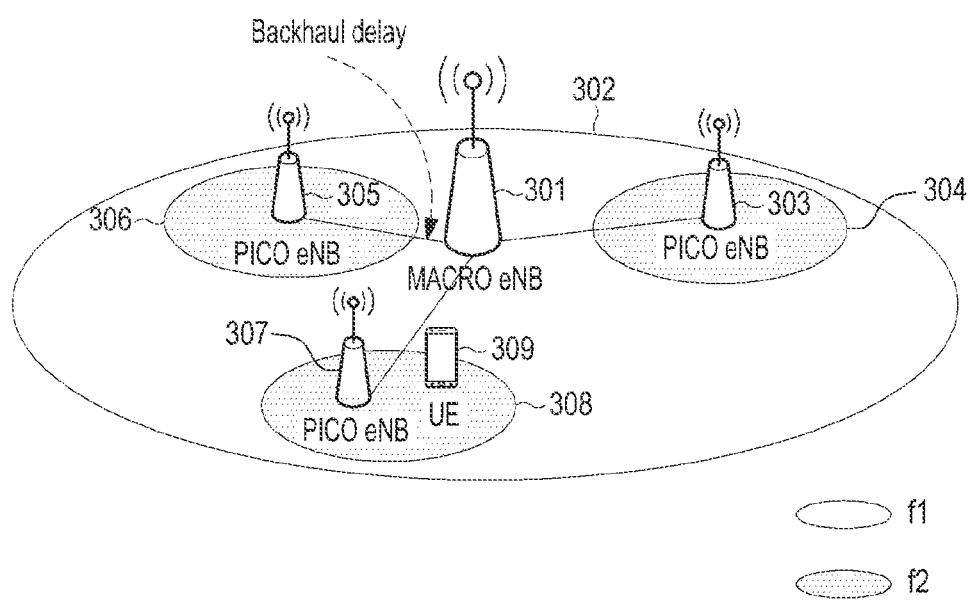
FIG. 3 is a diagram illustrating carrier aggregation between different eNBs in an LTE-A system, according to an embodiment of the present invention.

FIG. 3 is a diagram illustrating carrier aggregation between different eNBs in the LTE-A system, according to an embodiment of the present invention.

Referring to FIG. 3, the LTE-A system includes pico eNBs 303, 305, and 307 forming relatively small coverages 304, 306, and 308, within a coverage 302 of a macro eNB 301. The macro eNB 301 may transmit a signal with relatively higher power in comparison with the pico eNBs 304, 306, and 308, and the coverage of the macro eNB 301 is relatively wider than the coverages of the pico eNBs 304, 306, and 308. Further, the macro eNB 301 and the pico eNBs 303, 305, and 307 are mutually connected to each other, and have a predetermined backhaul delay between them. Accordingly, it is not preferable to exchange information sensitive to a transmission delay between the macro eNB 301 and the pico eNBs 303, 305, and 307.

Although FIG. 3 illustrates an example of carrier aggregation between the macro eNB 301 and the pico eNBs 303, 305, and 307, embodiments of the present invention are not limited thereto and may be applied to carrier aggregation between eNBs located at geographically different positions. For example, embodiments of the present invention may be applied to carrier aggregation between macro eNBs located at different positions, or carrier aggregation between pico eNBs located at different positions. In addition, the number of aggregated carriers is not limited.

In FIG. 3, it is assumed that the macro eNB 301 uses a frequency f1 for downlink signal transmission, and the pico eNBs 303, 305, and 307 use a frequency f2 for downlink signal transmission. Accordingly, the macro eNB 301 transmits data or control information to a UE 309 through the frequency f1, and the pico eNBs 303, 305, and 307 transmit data or control information to the UE 309 through the frequency f2. Through the carrier aggregation, the various eNBs 301, 303, 305, and 307 can simultaneously transmit signals to the UE 309 through different frequencies, and a peak data rate and system throughput can be achieved.

Further, the embodiment of the present invention may be applied to uplink carrier aggregation as well as the downlink carrier aggregation. For example, the UE 309 may transmit data or control information to the macro eNB 301 through the frequency f1 for uplink signal transmission, and transmit data or control information to the pico eNBs 303, 305, and 307 through the frequency f2 for uplink signal transmission.

In a carrier aggregation system, a cell consisting of a combination of a downlink CC and an uplink CC is called a Pcell or an Scell. The Pcell is a reference cell of an operation such as an initial access or handover by the UE 309, and provides basic radio resources to the UE 309. The Pcell includes a downlink Primary CC (PCC) and an uplink PCC.

The Scell is a cell providing additional radio resources to the UE 309, and includes a downlink Secondary CC (SCC) and an uplink SCC.

With respect to the UE 309 supporting the carrier aggregation, the eNBs 301, 303, 305, and 307 may determine whether to activate or deactivate the Scell and instruct the UE 309 to activate or deactivate the Scell. For example, when the eNBs 301, 303, 305, and 307 desire to provide a high speed data service to the UE 309, the eNBs 301, 303, 305, and 307 may activate the Scell to provide a peak data rate. Further, when the eNBs 301, 303, 305, and 307 determine that it is not needed to further provide the high speed data service to the UE 309 which has activated and operates the Scell, the eNBs 301, 303, 305, and 307 deactivate the Scell, such that the UE 309 does not perform a transmission/reception operation in the corresponding cell. Accordingly, unnecessary power consumption of the UE 309 is reduced. However, the eNBs 301, 303, 305, and 307 always keep the Pcell in an activated state, so that a basic communication function between the UE 309 and the eNBs 301, 303, 305, and 307 can be performed.

An example in which the macro eNB 301 activates the Scell of the pico eNB 307 with respect to the UE 309 performing carrier aggregation between different eNBs is described in greater detail below. Hereinafter, although the description will be made based on the pico eNB 307, the same description may be applied to other pico eNBs 303 and 305.

First, it is assumed that the macro eNB 301 operates the Pcell including the downlink PCC and the uplink PCC, and the pico eNB 307 operates the Scell including the downlink SCC and the uplink SCC. Further, it is assumed that a mutual information exchange between the macro eNB 301 and the pico eNB 307 is made through backhaul having a relatively large delay.

When the macro eNB 301 transmits an activation command of the Scell of the pico eNB 307, the UE 309 receives the command and feeds back a channel status of the corresponding Scell. Specifically, the UE 309 transmits CSI or a Sounding Reference Signal (SRS) through the uplink CC of the Scell at a preset transmission time. However, when the pico eNB 307 does not quickly receive information indicating that the Scell of the UE 309 is activated from the macro eNB 301 through the backhaul due to the backhaul delay between the pico eNB 307 and the macro eNB 301, the pico eNB 307 recognizes that the Scell of the pico eNB 307 with respect to the UE 309 is in a deactivated state. Further, the pico eNB 307 does not receive the CSI or SRS transmitted from the UE 309 through the uplink of the Scell. Accordingly, the UE 309 may waste battery power and cause an additional delay in activating the Scell.

Accordingly, embodiments of the present invention provide a method of quickly activating or deactivating the Scell.

Figure 4:
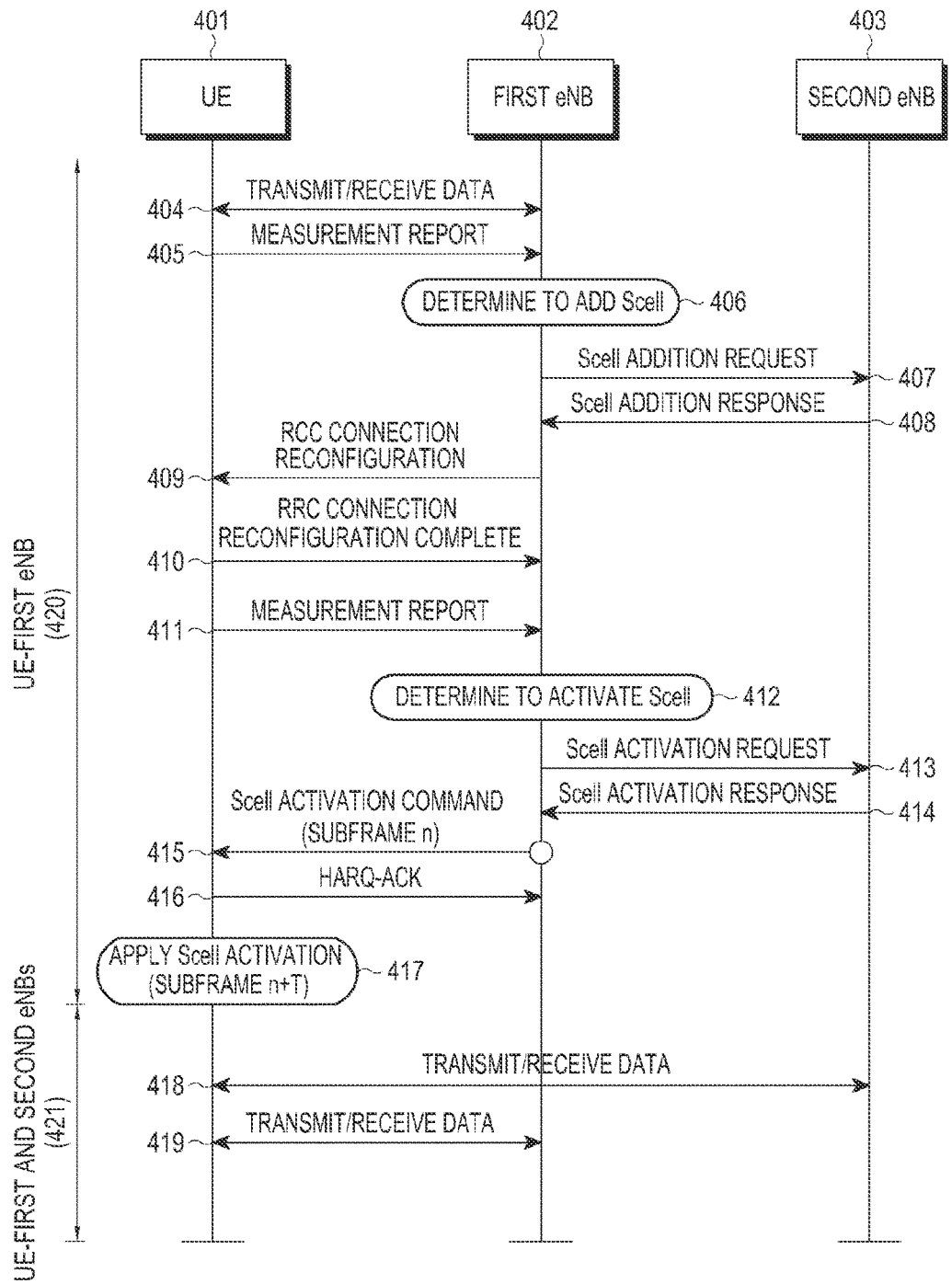
FIG. 4 is a diagram illustrating a process of activating an Scell in an LTE-A system supporting carrier aggregation between different eNBs, according to an embodiment of the present invention.

FIG. 4 is a diagram illustrating a process of activating the Scell in the LTE-A system supporting carrier aggregation between different eNBs, according to an embodiment of the present invention.

FIG. 4 illustrates a process in which a UE 401 transmits/receives data to/from a first eNB 402 through a downlink CC and an uplink CC, and performs carrier aggregation by adding a downlink CC and an uplink CC of a second eNB 403, which is geographically spaced apart from the first eNB 402. It is assumed that the downlink CC and the uplink CC of the first eNB 402 serve as the Pcell for the UE 401, and the downlink CC and the uplink CC of the second eNB 403 serve as the Scell for the UE 401, when the Scell is activated.

The UE 401 transmits/receives data to/from the first eNB 402, in step 404, and transmits a measurement report on neighboring cells to the first eNB 402, in step 405. When there is a received signal from each of the neighboring cells of which an intensity is larger than a predetermined threshold, the UE 401 may insert an ID and the intensity of the received signal of the corresponding cell in the measurement report and transmit the measurement report.

In step 406, the first eNB 402 determines whether to aggregate carriers with respect to the UE 401 with reference to the measurement report of the UE 401. When the first eNB 402 determines to add the Scell of the second eNB 403 with respect to the UE 401, the first eNB 402 transmits an Scell addition request message with respect to the UE 401 to the second eNB 403, in step 407. The Scell addition request message includes information on an ID of a cell which desires to apply the carrier aggregation with respect to the UE 401 and a UE ID.

The second eNB 403 determines whether to add the Scell with respect to the UE 401 in response to the Scell addition request message received from the first eNB 402. When the second eNB 403 determines to add the Scell, the second eNB 403 transmits an Scell addition response message to the first eNB 402, in step 408. Further, although not illustrated, when the second eNB 403 determines not to add the Scell, the second eNB 403 transmits an Scell addition failure message to the first eNB 402. The Scell addition response message includes information indicating that the second eNB 403 accepts the Scell addition request with respect to the UE 401. The Scell addition failure message includes information indicating that the second eNB 403 does not accept the Scell addition request with respect to the UE 401.

When the first eNB 402 receives the Scell addition response message with respect to the UE 401 from the second eNB 403, the first eNB 402 inserts related information required for the Scell addition with respect to the UE 401 in a Radio Resource Control (RRC) connection reconfiguration message and transmits the RRC connection reconfiguration message to the UE 401, in step 409. The related information required for the Scell addition may include a downlink CC bandwidth information of the Scell, antenna configuration information of the Scell, uplink CC bandwidth and center frequency information of the Scell, Physical Random Access Channel (PRACH) transmission related information of the Scell, uplink power control related information of the Scell, CSI transmission related information of the Scell, SRS transmission related information of the Scell, and downlink and uplink data transmission related information of the Scell.

The UE 401 performs a preparation process for performing communication with the Scell in response to the received RRC connection reconfiguration message, and then transmits an RRC connection reconfiguration complete message to the first eNB 402, in step 410. When the process up to step 410 has been completed, the UE 401 enters a state where data transmission/reception with the Scell of the second eNB 403 is completely ready. However, since the Scell of the second eNB 403 is in the deactivated state with respect to UE 401, the UE 401 may transmit/receive data to/from the Scell of the second eNB 403 after passing through an Scell activation process.

The UE 401 transmits the measurement report to the first eNB 402, in step 411. The measurement report may include a Buffer Status Report (BSR) indicating how much data to be transmitted by the UE 401 is stored in a buffer of the UE 401, or a Power Headroom Report (PHR) indicating information on available transmission power of the UE 401.

In step 412, the first eNB 402 determines whether to activate the Scell of the second eNB 403 added through the Scell addition process with respect to the UE 401. At this time, the first eNB 402 may refer to the measurement report received from the UE 401. When the first eNB 402 determines to activate the Scell of the second eNB 403 with respect to the UE 401, in step 412, the first eNB 402 transmits an Scell activation request message to the second eNB 403, in step 413. The Scell activation request message includes information on an ID of a cell which desires to activate the carrier aggregation with respect to the UE 401 and information on a UE ID.

The second eNB 403 determines whether to activate the Scell with respect to the UE 401 in response to the Scell activation request message received from the first eNB 402. When the second eNB 403 determines to activate the Scell, the second eNB 403 transmits an Scell activation response message to the first eNB 402, in step 414. Further, although not illustrated, when the second eNB 403 determines not to activate the Scell, the second eNB 403 transmits an Scell activation failure message to the first eNB 402. The Scell activation response message includes information indicating that the second eNB 403 accepts the Scell activation request with respect to the UE 401, and the Scell activation failure message includes information indicating that the second eNB 403 does not accept the Scell activation request with respect to the UE 401.

When the first eNB 402 receives the Scell activation response message with respect to the UE 401 from the second eNB 403, the first eNB 402 transmits an activation command of the Scell of the second eNB 403 to the UE 401 through a subframe n, in step 415. The Scell activation command may be configured by Media Access Control (MAC) signaling and transmitted through a PDSCH corresponding to a downlink data channel.

The UE 401 transmits HARQ-ACK to the first eNB 402, in step 416, when successfully receiving the Scell activation command. The UE 401 applies the activation of the Scell of the second eNB 403 at a time of a subframe n+T, in step 417. T denotes a predetermined value in consideration of a processing time of the UE 401, and may be determined as, for example, 8. Thereafter, the UE 401 transmits/receives data to/from the second eNB 403 and the first eNB 402 through steps 418 and 419.

In FIG. 4, the UE 401 can transmit/receive data only to/from the first eNB 402 before steps 404 to 417 are reflected, as indicated by a reference numeral 420. The UE 401 can transmit/receive data to/from all of the first eNB 402 and the second eNB 403 after steps 404 to 417 are reflected, as indicated by a reference numeral 421.

Figure 5:
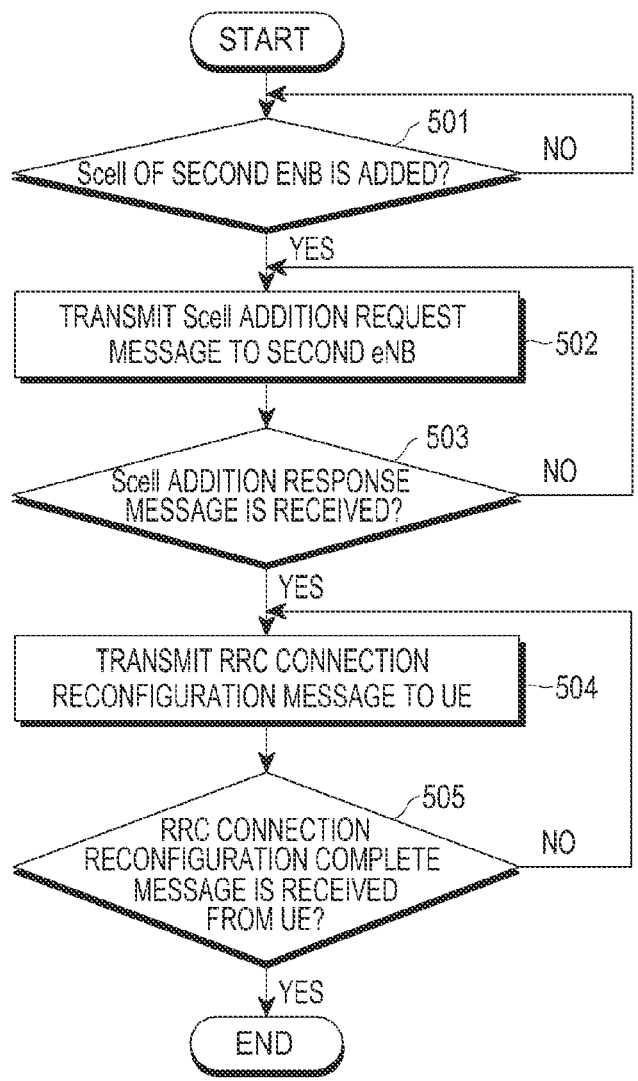
FIG. 5 is a flowchart illustrating a process in which a first eNB adds an Scell of a second eNB in an LTE-A system supporting carrier aggregation between different eNBs, according to an embodiment of the present invention.

FIG. 5 is a flowchart illustrating a process in which the first eNB adds the Scell of the second eNB in the LTE-A system supporting carrier aggregation between different eNBs, according to an embodiment of the present invention.

Referring to FIG. 5, the first eNB 402 determines whether to add the Scell of the second eNB 403 with respect to the UE 401, in step 501. The first eNB 402 may refer to a measurement report received from the UE 401. When the first eNB 402 determines to add the Scell, in step 501, the first eNB 402 transmits an Scell addition request message with respect to the UE 401 to the second eNB 403, in step 502. When the first eNB 402 determines not to add the Scell, step 501 is continuously performed. The Scell addition request message includes information on an ID of a cell which desires to apply the carrier aggregation with respect to the UE 401 and information on a UE ID.

When the first eNB 402 transmits the Scell addition request message with respect to the UE 401 to the second eNB 403, the first eNB 402 determines whether an Scell addition response message is received from the second eNB 403, in step 503. When the first eNB 402 does not receive the Scell addition response message, the first eNB 402 returns to step 502 and retransmits the Scell addition request message to the second eNB 403. When the first eNB 402 receives the Scell addition response message, the first eNB 402 inserts related information required for the Scell addition in an RRC connection reconfiguration message and transmits the RRC connection reconfiguration message to the UE 401, in step 504.

After transmitting the RRC connection reconfiguration message, the first eNB 402 determines whether an RRC connection reconfiguration complete message is received from the UE 401 in response to the RRC connection reconfiguration message, in step 505. When the first eNB 402 does not receive the RRC connection reconfiguration complete message, the first eNB 402 returns to step 504 and retransmits the RRC connection reconfiguration message to the UE 401. When the first eNB 402 receives the RRC connection reconfiguration complete message, the first eNB 402 completes the process for adding the Scell of the second eNB 403.

Figure 6:
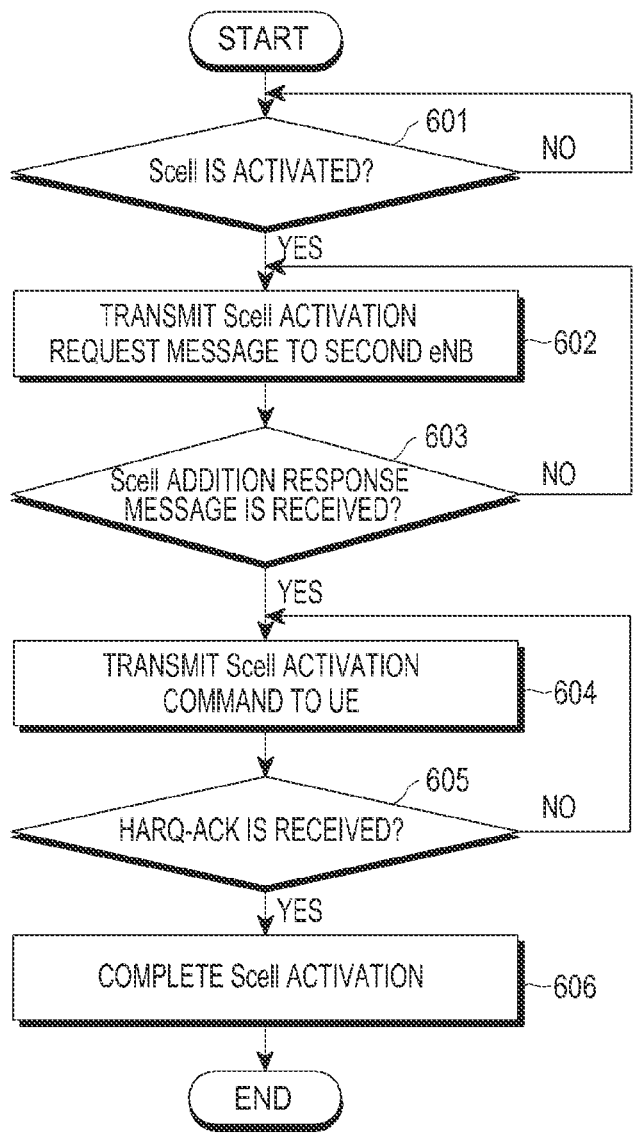
FIG. 6 is a flowchart illustrating a process in which a first eNB adds and then activates an Scell of a second eNB in an LTE-A system supporting carrier aggregation between different eNBs, according to another embodiment of the present invention.

FIG. 6 is a flowchart illustrating a process in which the first eNB adds and then activates the Scell of the second eNB in the LTE-A system supporting carrier aggregation between different eNBs, according to an embodiment of the present invention.

Referring to FIG. 6, the first eNB 402 determines whether to activate the Scell of the second eNB 403 added through the Scell addition process step with respect to the UE 401, in step 601. The first eNB 402 may refer to a measurement report received from the UE 401, and the measurement report may include a buffer status report indicating how much data to be transmitted by the UE 401 is stored in a buffer of the UE 401 or a PHR indicating information on available transmission power of the UE 401. When the first eNB 402 determines not to activate the Scell of the second eNB 403 with respect to the UE, step 601 is continuously performed. In contrast, when the first eNB 402 determines to activate the SCell, the first eNB 402 transmits an Scell activation request message to the second eNB 403, in step 602. The Scell activation request message includes information on an ID of a cell which desires to activate the carrier aggregation with respect to the UE 401 and information on a UE ID.

Thereafter, the first eNB 402 determines whether an Scell activation response message is received from the second eNB 403 in response to the Scell activation request message, in step 603. When the first eNB 402 does not receive the Scell activation response message, the first eNB 402 returns to step 602 and retransmits the Scell activation request message to the second eNB 403. When the first eNB 402 receives the Scell activation response message, the first eNB 402 moves to step 604 and transmits an Scell activation command to the UE 401. In order to transmit the Scell activation command to the UE 401, the first eNB 402 is required to receive the Scell activation response message from the second eNB 403, and the Scell activation command may be configured by MAC signaling and transmitted through a PDSCH corresponding to a downlink data channel.

After transmitting the Scell activation command, the first eNB 402 determines whether HARQ-ACK for the SCell activation command is received from the UE 401, in step 605. When the first eNB 402 does not receive the HARQ-ACK, the first eNB 402 returns to step 604 and retransmits the Scell activation command to the UE 401. When the first eNB 402 receives the HARQ-ACK, the first eNB 402 recognizes that the UE 401 has completely activated the Scell of the second eNB 403, in step 606. When the first eNB 402 receives the HARQ ACK for the Scell activation command from the UE 401 after transmitting the Scell activation command in a subframe n, the first eNB 402 determines that the UE 401 applies the activation of the Scell of the second eNB 403 at a time of a subframe n+T.

Figure 7:
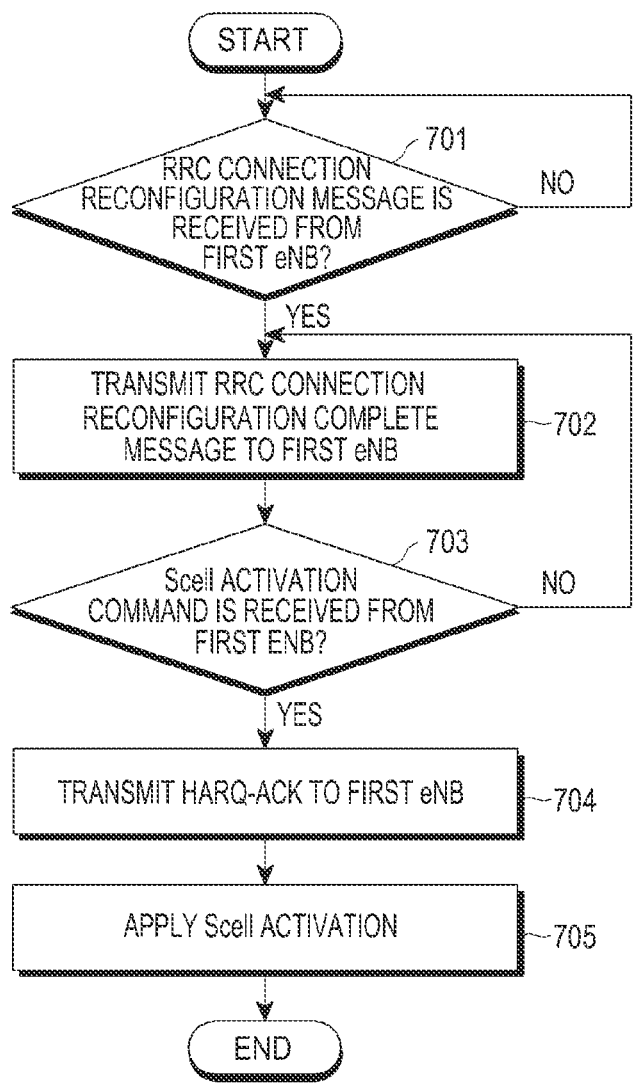
FIG. 7 is a flowchart illustrating a process in which a UE adds and activates an Scell of a second eNB according to an instruction of a first eNB in an LTE-A system supporting carrier aggregation between different eNBs, according to an embodiment of the present invention.

FIG. 7 is a flowchart illustrating a process in which the UE adds and activates the Scell of the second eNB according to an instruction of the first eNB in the LTE-A system supporting carrier aggregation between different eNBs, according to an embodiment of the present invention.

Referring to FIG. 7, the UE 401 determines whether an RRC connection reconfiguration message including related information required for adding the Scell of the second eNB 403 is received from the first eNB 402, in step 701.

When the UE 401 does not receive the RRC connection reconfiguration message, the UE 401 moves to step 701 and waits to receive the RRC connection reconfiguration message. When the UE 401 receives the RRC connection reconfiguration message, the UE 401 moves to step 702 and transmits an RRC connection reconfiguration complete message to the first eNB 402 in response to the RRC connection reconfiguration message. Thereafter, the UE 401 determines whether the activation command of the Scell of the second eNB 403 added through the Scell addition process is received from the first eNB 402, in step 703. When the UE 401 does not receive the Scell activation command, the UE 401 returns to step 702 and retransmits the RRC connection reconfiguration complete message to the first eNB 402. When the UE 401 receives the Scell activation command, the UE moves to step 704 and transmits HARQ ACK for the Scell activation command to the first eNB 402. Further, when the UE 401 receives the Scell activation command from the first eNB 402 through a subframe n, the UE 401 applies the activation of the Scell of the second eNB 403 at a time of a subframe n+T, in step 705.

Figure 8:
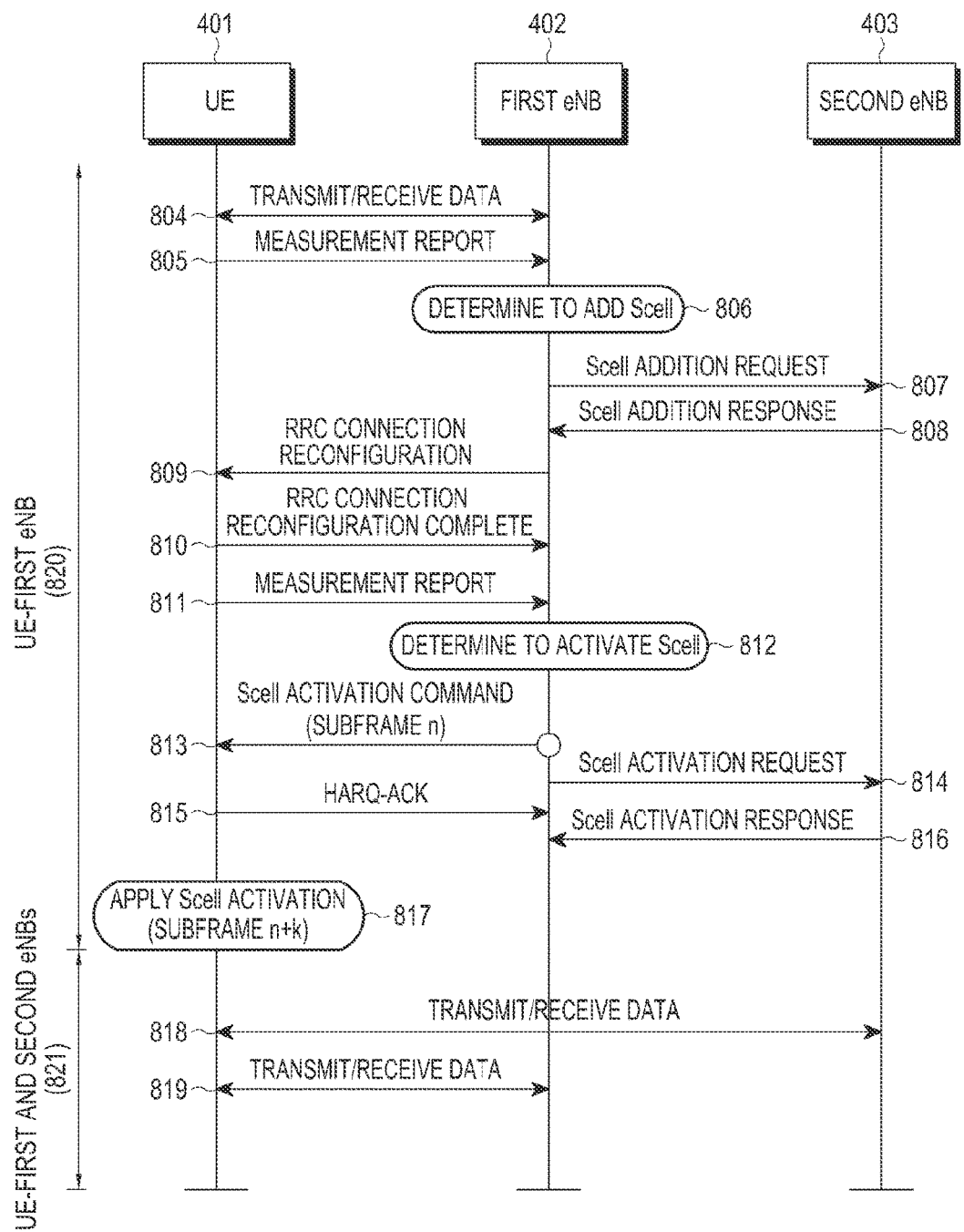
FIG. 8 is a diagram illustrating a process of activating an Scell in an LTE-A system supporting carrier aggregation between different eNBs, according to another embodiment of the present invention.

FIG. 8 is a diagram illustrating a process of activating the Scell in the LTE-A system supporting carrier aggregation between different eNBs, according to another embodiment of the present invention.

The UE 401 transmits/receives data to/from the first eNB 402, in step 804, and transmits a measurement report on neighboring cells to the first eNB 402, in step 805. For example, when there is a received signal from each of the neighboring cells of which an intensity is larger than a predetermined threshold, the UE 401 may insert an ID and the intensity of the received signal of the corresponding cell in the measurement report, and transmit the measurement report.

The first eNB 402 determines to perform the carrier aggregation with respect to the UE 401 with reference to the measurement report of the UE 401, in step 806. When the first eNB 402 determines to add the Scell of the second eNB 403 with respect to the UE 401, the first eNB 402 transmits an Scell addition request message with respect to the UE 401 to the second eNB 403, in step 807. The Scell addition request message includes information on an ID of a cell which desires to apply the carrier aggregation with respect to the UE 401 and information on a UE ID.

The second eNB 403 determines whether to add the Scell with respect to the UE 401 in response to the Scell addition request message received from the first eNB 402. When the second eNB 403 determines to add the Scell, the second eNB 403 transmits an Scell addition response message to the first eNB 402, in step 808. Further, although not illustrated, when the second eNB 403 determines not to add the Scell, the second eNB 403 transmits an Scell addition failure message to the first eNB 402. The Scell addition response message includes information indicating that the second eNB 403 accepts the Scell addition request of the first eNB 402 with respect to the UE 401, and the second eNB 403 may inform the first eNB 402 of an activation time when the UE 401 applies the Scell activation. The Scell addition failure message includes information indicating that the second eNB 403 does not accept the Scell addition request with respect to the UE 401.

When the first eNB 402 receives the Scell addition response message with respect to the UE 401 from the second eNB 403, the first eNB 402 inserts related information required for the Scell addition with respect to the UE 401 in an RRC connection reconfiguration message, and transmits the RRC connection reconfiguration message to the UE 401, in step 809. The related information required for the Scell addition may include downlink CC bandwidth information of the Scell, antenna configuration information of the Scell, uplink CC bandwidth and center frequency information of the Scell, Physical Random Access Channel (PRACH) transmission related information of the Scell, uplink power control related information of the Scell, CSI transmission related information of the Scell, SRS transmission related information of the Scell, downlink and uplink data transmission related information of the Scell, and an Scell activation time K of the UE. The Scell activation time K of the UE 401 may be notified to the second eNB 403 by the first eNB 402, or may be predefined in consideration of the backhaul delay between the first eNB and the second eNB.

The UE 401 performs a preparation process for performing communication with the Scell in response to the received RRC connection reconfiguration message, and then transmits an RRC connection reconfiguration complete message to the first eNB 402, in step 810. After completing the preparation for transmitting/receiving data to/from the Scell, the UE 401 transmits a measurement report to the first eNB 402 to activate the Scell, in step 811. The measurement report may include a buffer status report indicating how much data to be transmitted by the UE 401 is stored in a buffer of the UE 401 or a PHR indicating information on available transmission power of the UE 401.

In step 812, the first eNB 402 determines whether to activate the Scell of the second eNB 403 added through the Scell addition process with respect to the UE 401. The first eNB 402 may refer to the measurement report received from the UE 401, in step 811. When the first eNB 402 determines to activate the Scell of the second eNB 403 with respect to the UE 401 in step 812, the first eNB 402 transmits an activation command of the Scell of the second eNB 403 to the UE 401 through a subframe n, in step 813. The Scell activation command may be configured by MAC signaling and transmitted through a PDSCH corresponding to a downlink data channel. When the UE 401 successfully receives the Scell activation command, the UE 401 transmits HARQ-ACK to the first eNB 402, in step 815.

Meanwhile, unlike the first embodiment of the present invention, the first eNB 402 does not transmit an Scell activation request message to the second eNB 403 before transmitting the SCell activation command to the UE 401, and does not wait to receive an Scell activation response message from the second eNB 403. Specifically, the first eNB 402 transmits the Scell activation request message to the second eNB 403, in step 814 after transmitting the Scell activation command. Accordingly, it is possible to reduce a delay which can be generated until the Scell activation is completed by the UE 401. The Scell activation request message includes information on an ID of a cell which desires to activate the carrier aggregation for the UE 401 and information on a UE ID.

The second eNB 403 determines whether to activate the Scell with respect to the UE 401 in response to the Scell activation request message received from the first eNB 402. When the second eNB 403 determines to activate the Scell, the second eNB 403 transmits an Scell activation response message to the first eNB 402, in step 816. Further, although not illustrated, when the second eNB 403 determines not to activate the Scell, the second eNB 403 transmits an Scell activation failure message to the first eNB 402. The Scell activation response message includes information indicating that the second eNB 403 accepts the Scell activation request with respect to the UE 401, and the Scell activation failure message includes information indicating that the second eNB 403 does not accept the Scell activation request with respect to the UE 401.

In step 817, the UE 401 applies the activation of the Scell of the second eNB 403 at a time of a subframe n+K. K refers to a value indicating an Scell activation time of the UE 401 and is notified by the first eNB. Thereafter, the UE 401 transmits/receives data to/from the second eNB 403 and the first eNB 402 through steps 818 and 819.

In FIG. 8, the UE 401 can transmit/receive data only to/from the first eNB 402 before steps 804 to 817 are reflected, as indicated by a reference numeral 820. The UE 401 can transmit/receive data to/from all of the first eNB 402 and the second eNB 403 after steps 804 to 817 are reflected, as indicated by a reference numeral 821.

The process of activating the Scell according to this embodiment of the present invention includes the same process as that of the previous embodiment of the present invention, but has the following differences.

First, the first eNB 402 determines whether the Scell addition response message is received from the second eNB 403, and the Scell addition response message includes an activation time K when the Scell activation by the UE is applied.

When the first eNB 402 does not receive the Scell addition response message with respect to the UE 401 from the second eNB 403, the first eNB 402 performs a related process. In contrast, when the first eNB 402 receives the Scell addition response message with respect to the UE 401 from the second eNB 403, the first eNB 402 inserts related information required for the Scell addition with respect to the UE 401 in an RRC connection reconfiguration message and transmits the RRC connection reconfiguration message to the UE 401.

Figure 9:
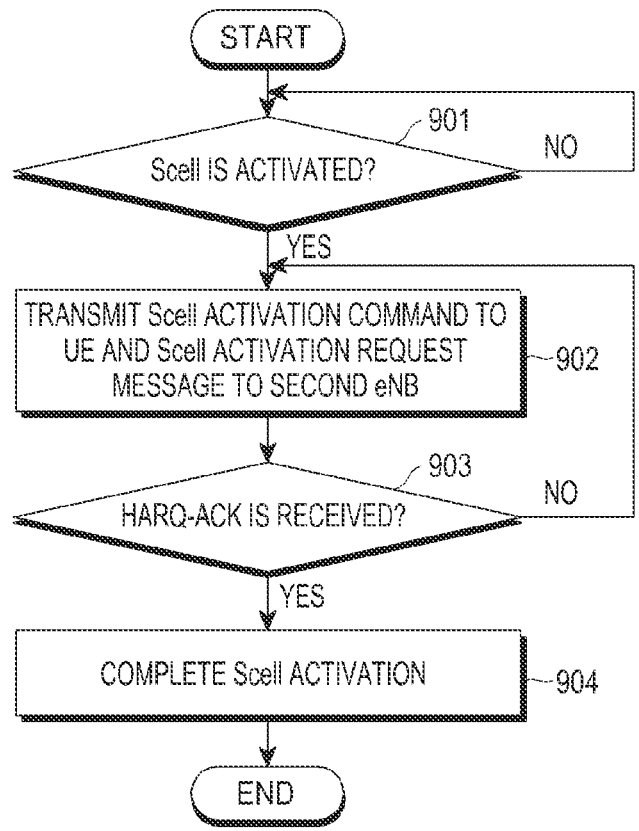
FIG. 9 is a flowchart illustrating a process in which a first eNB activates an Scell of a second eNB in an LTE-A system supporting carrier aggregation between different eNBs, according to another embodiment of the present invention.

FIG. 9 is a flowchart illustrating a process in which the first eNB activates the Scell of the second eNB in the LTE-A system supporting carrier aggregation between different eNBs, according to another embodiment of the present invention.

Referring to FIG. 9, the first eNB 402 determines whether to activate the Scell of the second eNB 403 added through the Scell addition process with respect to the UE 401, in step 901. The first eNB 402 may refer to a measurement report received from the UE 401. The measurement report may include a BSR indicating how much data to be transmitted by the UE 401 is stored in a buffer of the UE 401 or a PHR indicating information on available transmission power of the UE 401. When the first eNB 402 determines not to activate the Scell of the second eNB 401 with respect to the UE 401, step 901 is continuously performed.

When the first eNB 402 determines to activate the Scell of the second eNB 403 with respect to the UE 401, the first eNB 402 transmits an Scell activation command to the UE 401 and transmits an Scell activation request message to the second eNB 403, in step 902. The Scell activation command may be configured by MAC signaling and transmitted through a PDSCH corresponding to a downlink data channel. The Scell activation request message includes information on an ID of a cell which desires to activate the carrier aggregation for the UE 401 and information on a UE ID. A transmission time when the first eNB 402 transmits the Scell activation command to the UE 401 and a transmission time when the first eNB 402 transmits the Scell activation request message to the second eNB 403 are not limited and are independently processed by the first eNB 402.

The first eNB 402 determines whether HARQ ACK for the Scell activation command is received from the UE 401, in step 903. When the first eNB 402 does not receive the HARQ-ACK from the UE 401, the first eNB 402 returns to step 902 and retransmits the Scell activation command to the UE 401. In contrast, when the first eNB 402 receives the HARQ-ACK from the UE 401, the first eNB 402 proceeds to step 904 and recognizes that the UE 401 has completely activated the Scell of the second eNB 403. When the first eNB 402 receives the HARQ-ACK for the Scell activation command from the UE 401 after transmitting the Scell activation command in a subframe n, the first eNB 402 determines that the UE 401 applies the activation of the Scell of the second eNB 403 at a time of a subframe n+K. K refers to a value indicating an Scell activation time by the UE 401 and is notified to the UE 401 by the first eNB 402.

The process according to this embodiment of the present invention, in which the UE 401 adds and activates the Scell of the second eNB 403 according to an instruction of the first eNB 402, includes the same process as that of the previous embodiment of the present invention, but also includes the following differences.

Specifically, the UE 401 determines whether an RRC connection reconfiguration message including related information required for adding the Scell of the second eNB 403 is received from the first eNB 402.

When the UE 401 does not receive the RRC connection reconfiguration message, the UE 401 waits until a next reception time. In contrast, when the UE 401 receives the RRC connection reconfiguration message, the UE 401 transmits an RRC connection reconfiguration complete message to the first eNB 402 in response to the RRC connection reconfiguration message.

After completing a preparation for transmitting/receiving data to/from the Scell, the UE 401 determines whether the activation command of the Scell of the second eNB 403 is received from the first eNB 402 to activate the Scell. When the UE 401 does not receive the Scell activation command, the UE 401 waits until a next reception time. In contrast, when the UE 401 receives the Scell activation command, the UE 401 transmits HARQ-ACK for the SCell activation command to the first eNB 402. At this time, when the UE 401 receives the Scell activation command from the first eNB 402 through a subframe n, the UE 401 applies the activation of the Scell of the second eNB 403 at a time of a subframe n+K. K refers to a value indicating an Scell activation time by the UE and is notified to the UE 401 by the first eNB 402.

Although this embodiment of the present invention has described, as an example, that the first eNB 402 inserts the Scell activation time K of the UE in the RRC connection reconfiguration message and transmits the RRC connection reconfiguration message, the first eNB 402 may insert the Scell activation time K in the Scell activation command and transmit the Scell activation command to the UE 401 in another embodiment of the present invention.

Figure 10:
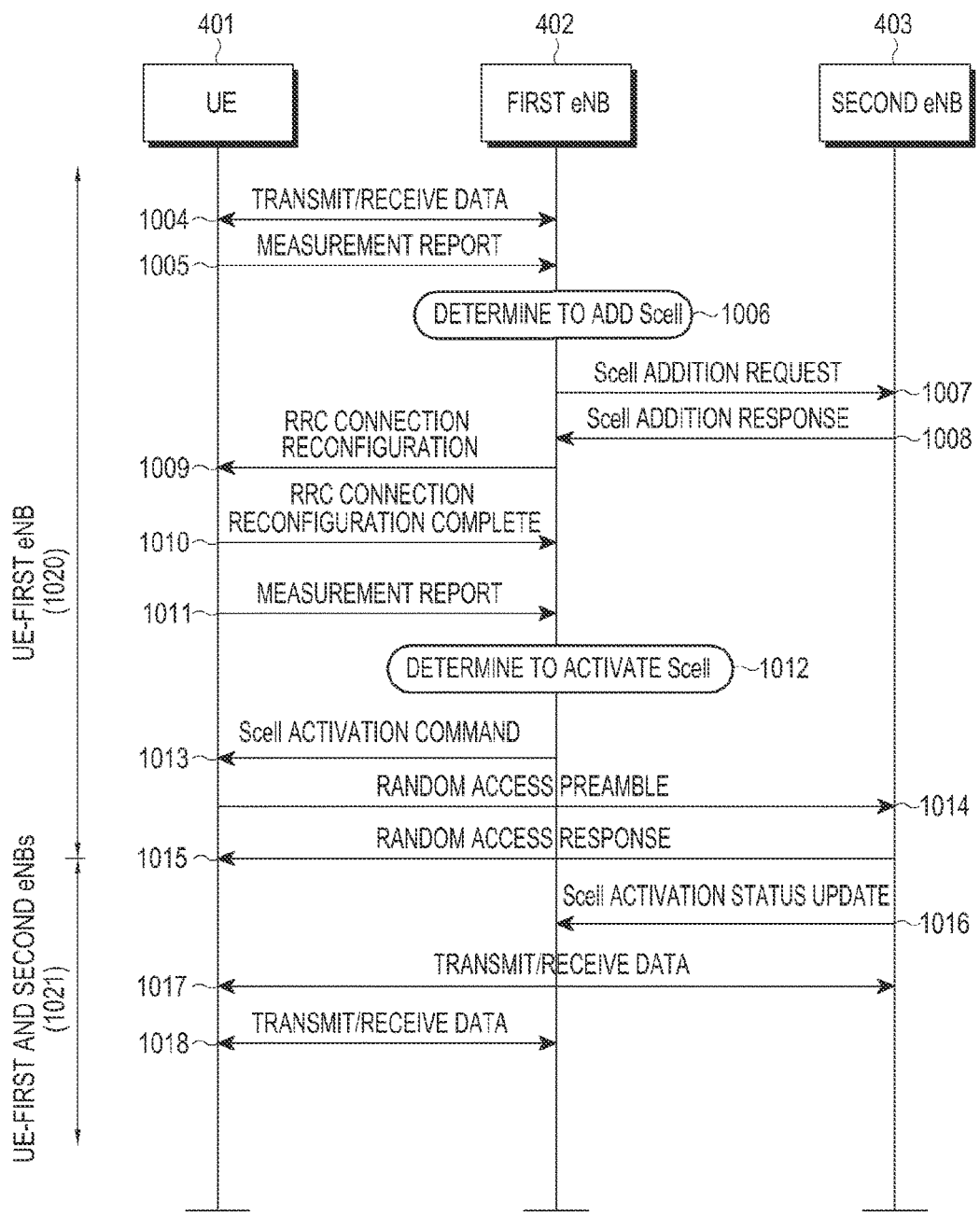
FIG. 10 is a diagram illustrating a process of activating an Scell in an LTE-A system supporting carrier aggregation between different eNBs, according to another embodiment of the present invention.

FIG. 10 is a diagram illustrating a process of activating the Scell in the LTE-A system supporting carrier aggregation between different eNBs, according to another embodiment of the present invention.

In the previous two embodiments of the present invention, when the UE 401 receives the activation command of the Scell of the second eNB 403 from the first eNB 402, the UE 401 transmits HARQ-ACK for the Scell activation command to the first eNB 402 and applies the activation of the Scell of the second eNB 403 after a preset timing. In this embodiment of the present invention, when the UE 401 receives the activation command of the Scell of the second eNB 403 from the first eNB 402, the UE 401 may perform a random access process to the second eNB 403 and complete the Scell activation.

Referring to FIG. 10, steps 1004 to 1011 are the same as steps 404 to 411 of FIG. 4 and steps 804 to 811 of FIG. 8.

In step 1012, the first eNB 402 determines whether to activate the Scell of the second eNB 403 added through the Scell addition process with respect to the UE 401. The first eNB 402 may refer to a measurement report received from the UE 401, in step 1011. When the first eNB 402 determines to activate the Scell of the second eNB 403 with respect to the UE 401, in step 1012, the first eNB 402 transmits an activation command of the Scell of the second eNB 403 to the UE 401, in step 1013. The Scell activation command may be inserted in a Physical Downlink Control Channel (PDCCH) order corresponding to a downlink physical control channel in which the first eNB 402 makes a request for performing a random access to the UE 401, and then transmitted.

When the UE 401 successfully receives the Scell activation command in step 1013, the UE 401 transmits a random access preamble to the second eNB 403 according to PRACH transmission related information of the Scell included in the RRC connection reconfiguration message received in step 1009, in step 1014. The UE 401 continuously maintains a connection with the first eNB 402 while transmitting the random access preamble to the second eNB 403.

When the UE 401 receives a Random Access Response (RAR) from the second eNB 403 in response to the random access preamble, in step 1015, the UE 401 applies the activation of the Scell of the second eNB 403. Further, in step 1016, the second eNB 403 transmits an Scell activation status update message informing the first eNB 402 that the UE 401 has applied the Scell activation. Thereafter, the UE 401 can transmit/receive data to/from the second eNB 403 and the first eNB 402 through steps 1017 and 1018.

In FIG. 10, the UE can transmit/receive data only to/from the first eNB 402 before steps 1004 to 1015 are reflected, as indicated by a reference numeral 1020. The UE can transmit/receive data to/from all of the first eNB 402 and the second eNB 403 after steps 1004 to 1015 are reflected, as indicated by a reference numeral 1021.

Figure 11:
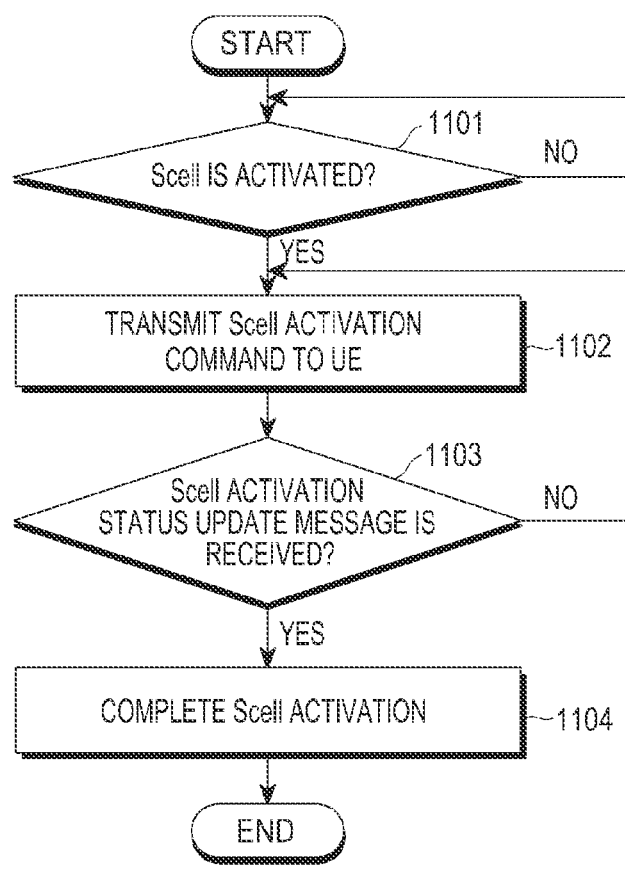
FIG. 11 is a flowchart illustrating a process in which a first eNB adds and then activates an Scell of a second eNB in an LTE-A system supporting carrier aggregation between different eNBs, according to another embodiment of the present invention.

FIG. 11 is a flowchart illustrating a process in which the first eNB adds and then activates the Scell of the second eNB in the LTE-A system supporting carrier aggregation between different eNBs, according to another embodiment of the present invention. Referring to FIG. 11, the first eNB 402 determines whether to activate the Scell of the second eNB 403 added through the Scell addition process with respect to the UE 401, in step 1101. The first eNB 402 may refer to a measurement report received from the UE 401, and the measurement report may include a BSR indicating how much data to be transmitted by the UE 401 is stored in a buffer of the UE 401, or a PHR indicating information on available transmission power of the UE 401. When the first eNB 402 determines not to activate the Scell of the second eNB 403 with respect to the UE 401, step 1101 is continuously performed. In contrast, when the first eNB 402 determines to activate the Scell of the second eNB 403 with respect to the UE 401, the first eNB 402 transmits an Scell activation command to the UE 401, in step 1102. The Scell activation command may be inserted in a PDCCH order corresponding to a downlink physical control channel in which the first eNB 402 makes a request for performing a random access to the UE 401, and then transmitted.

Thereafter, the first eNB 402 determines whether an Scell activation status update message of the UE 401 is received from the second eNB 403, in step 1103. When the first eNB 402 does not receive the Scell activation status update message, the first eNB 402 returns to step 1102 and retransmits the Scell activation command to the UE 401. When the first eNB 402 receives the Scell activation status update message, the first eNB 402 recognizes that the UE 401 has activated the Scell and completes the Scell activation process, in step 1104.

Figure 12:
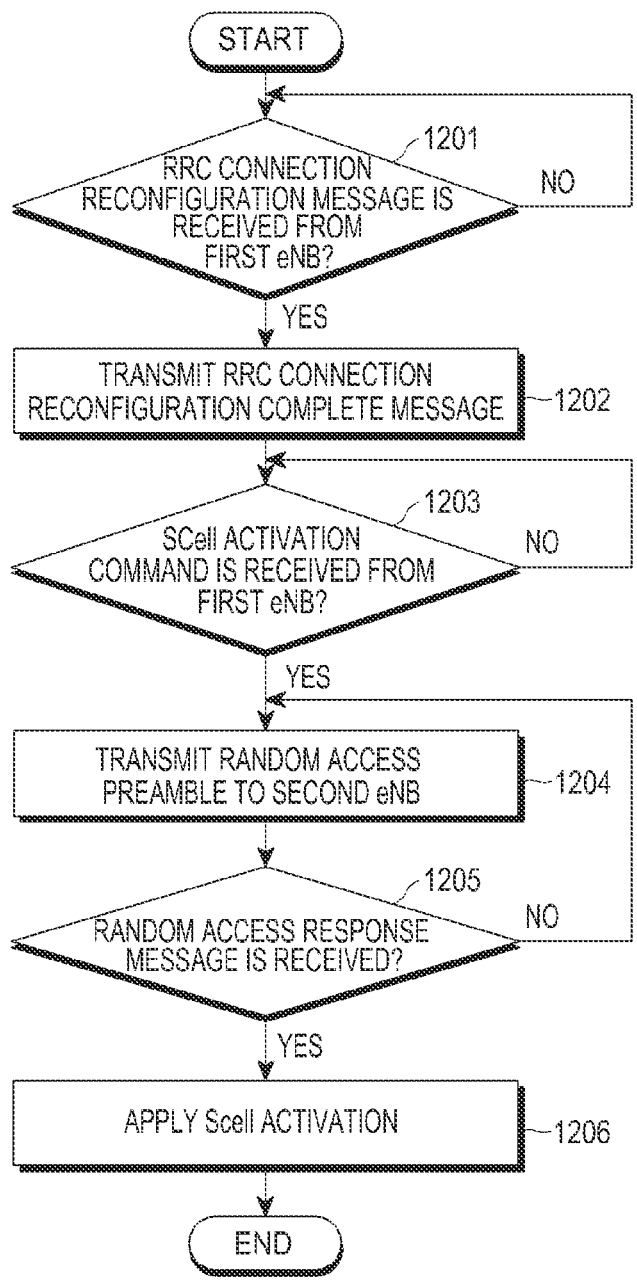
FIG. 12 is a flowchart illustrating a process in which a UE adds and activates an Scell of a second eNB according to an instruction of a first eNB in an LTE-A system supporting carrier aggregation between different eNBs, according to another embodiment of the present invention.

FIG. 12 is a flowchart illustrating a process in which the UE adds and activates the Scell of the second eNB according to an instruction of the first eNB in the LTE-A system supporting carrier aggregation between different eNBs, according to another embodiment of the present invention.

Referring to FIG. 12, the UE 401 determines whether an RRC connection reconfiguration message including related information required for adding the Scell of the second eNB 403 is received from the first eNB 402, in step 1201. The related information required for the Scell addition may include downlink CC bandwidth information of the Scell, antenna configuration information of the Scell, uplink CC bandwidth and center frequency information of the Scell, PRACH transmission related information of the Scell, uplink power control related information of the Scell, CSI transmission related information of the Scell, SRS transmission related information of the Scell, and downlink and uplink data transmission related information of the Scell.

When the UE 401 does not receive the RRC connection reconfiguration message, the UE 401 returns to step 1201 and waits to receive the RRC connection reconfiguration message. When the UE 401 receives the RRC connection reconfiguration message, the UE 401 transmits an RRC connection reconfiguration complete message to the first eNB 402 in response to the RRC connection reconfiguration message, in step 1202. Thereafter, the UE 401 determines whether an activation command of the Scell of the second eNB 403 is received from the first eNB 402, in step 1203. The Scell activation command may be included in a PDCCH order transmitted to the UE 401 by the first eNB 402.

When the UE 401 does not receive the Scell activation command, the UE 401 returns to step 1203 and waits to receive the activation command. When the UE 401 receives the Scell activation command, the UE 401 proceeds to step 1204 and transmits a random access preamble to the second eNB 403 to make a request for the Scell activation to the second eNB 403, in step 1204. Further, the UE 401 determines whether a random access response message is received from the second eNB 403, in step 1205. As a result of the determination, when the UE 401 does not receive the random access response message, the UE 401 proceeds to step 1204 and retransmits the random access preamble to the second eNB 403. When the UE 401 receives the random access response message, the UE 401 proceeds to step 1206 and applies the activation of the Scell of the second eNB.

The method in which the UE 401 activates the Scell of the second eNB 403 has been described. In the method, the UE 401 may receive Scell activation commands that collide with each other at the same time from a plurality of eNBs 402 and 403. Specifically, like a case where the first eNB 402 instructs the UE 401 to activate the Scell of the second eNB 403 and the second eNB 403 instructs the UE 401 to deactivate the Scell of the second eNB 403 at the same time, the first eNB 402 and the second eNB 403 located at different positions may understand the Scell activation status in different ways. In order to solve the above problem, the Scell activation (or deactivation) command received from the eNB, which the UE 401 should follow, may be preset or the Scell activation (or deactivation) command received from the eNB, which the UE 401 should not follow, may be preset.

Further, when a mutual scheduling information exchange is not quickly made since the first eNB 402 and the second eNB 403 are spaced apart from each other and there is the backhaul delay between them, the UE 401 may simultaneously receive a deactivation command of the Scell of the second eNB 403 from the first eNB 402 and scheduling information on the Scell of the second eNB 403 from the second eNB 403. At this time, the UE 401 may operate through one of the following Methods 1 to 4.

Method 1: The UE 401 may receive a PDSCH signal from a corresponding cell or transmit a PUSCH signal to a corresponding cell according to scheduling of the second eNB, and disregard the Scell deactivation command received from the first eNB.

Method 2: The UE 401 may deactivate a corresponding cell according to the Scell deactivation command received from the first eNB 402, and disregard scheduling of a PDSCH or a PUSCH of the second eNB 403.

Method 3: The UE 401 may follow the Scell deactivation command or scheduling for carrier aggregation within the same eNB, and disregard the Scell deactivation command or scheduling for carrier aggregation between eNBs.

Method 4: The Scell deactivation command is transmitted by a corresponding Scell, so that a case where the Scell deactivation command and scheduling are simultaneously generated within the same cell can be prevented.

Figure 13:
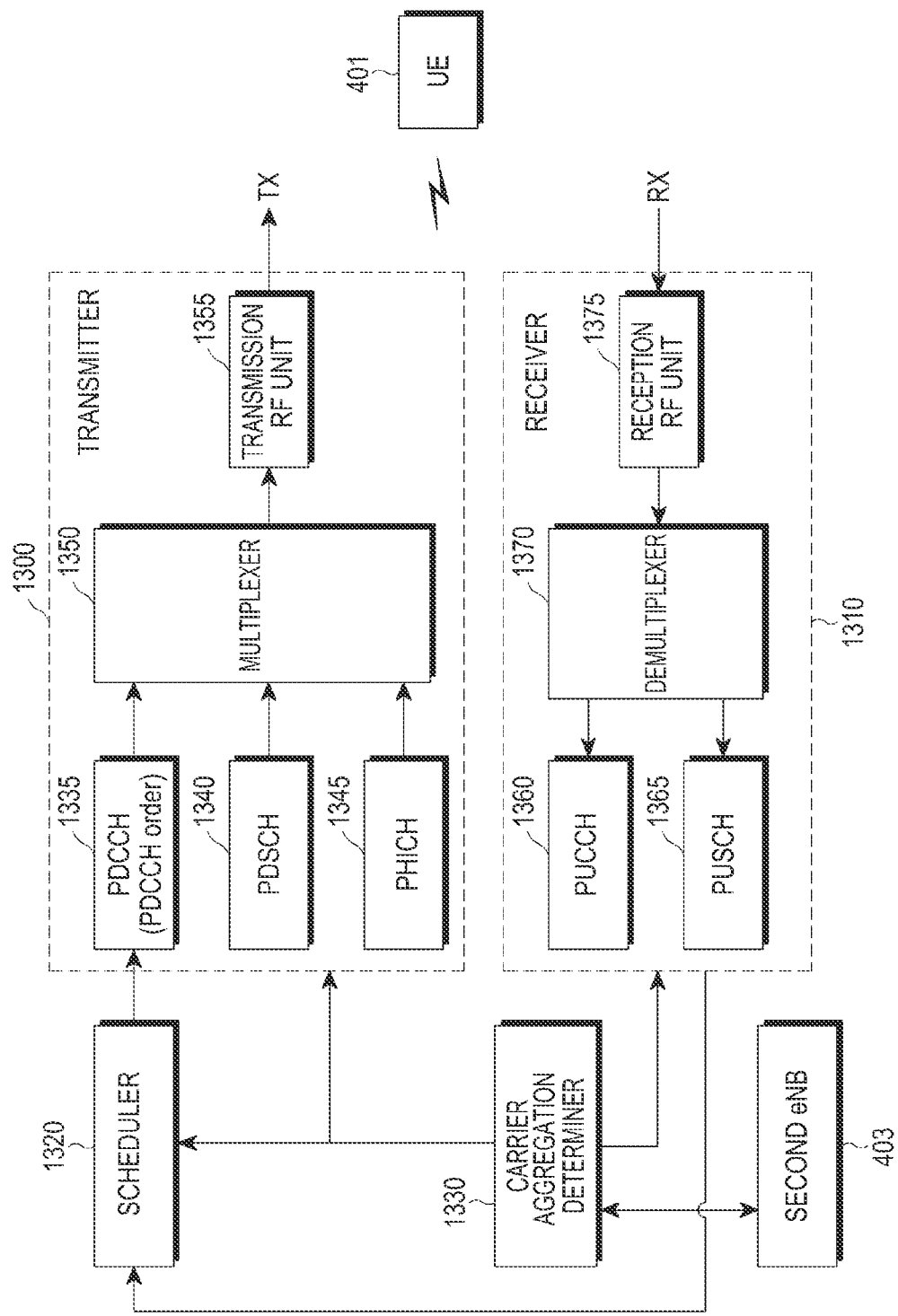
FIG. 13 is a diagram illustrating a configuration of an eNB in an LTE-A system supporting carrier aggregation between different eNBs, according to an embodiment of the present invention.

FIG. 13 is a diagram illustrating a configuration of the first eNB in the LTE-A system supporting carrier aggregation between different eNBs, according to an embodiment of the present invention. The second eNB 403 may include the same configuration as that of the first eNB 402.

Referring to FIG. 13, the first eNB 402 includes a transmitter 1300, a receiver 1310, a carrier aggregation determiner 1330, and a scheduler 1320.

The transmitter 1300 includes a PDCCH unit 1335, a PDSCH unit 1340, a PHICH unit 1345, a multiplexer 1350, and a transmission Radio Frequency (RF) unit 1355. The receiver 1310 includes a PUCCH unit 1360, a PUSCH unit 1365, a demultiplexer 1370, and a reception RF unit 1375.

The PDCCH unit 1335 generates a PDCCH by performing a process such as, channel coding or modulation, for downlink control information including scheduling information according to a control of the scheduler 1320 and the carrier aggregation determiner 1330. The PDSCH unit 1340 generates a PDSCH by performing a process such as, channel coding or modulation, for downlink data according to a control of the scheduler 1320 and the carrier aggregation determiner 1330. The PHICH unit 1345 generates a PHICH by performing a process such as, channel coding or modulation, for HARQ-ACK/NACK information of uplink data according to a control of the scheduler 1320 and the carrier aggregation determiner 1330.

The PDCCH, the PDSCH, the PHICH generated by the PDCCH unit 1335, the PDSCH unit 1340, and the PHICH unit 1345 are multiplexed by the multiplexer 1350, signal-processed by the transmission RF unit 1355, and then transmitted to the UE 401. For example, the aforementioned RRC connection reconfiguration message is transmitted through the PDSCH, and the Scell activation command is configured by MAC signaling and transmitted through the PDSCH or through a PDCCH order.

The receiver 1310 demultiplexes signals received from the UE 401 and distributes the signals to the PUCCH unit 1360 and the PUSCH unit 1365. The PUCCH unit 1360 acquires information such as HARQ-ACKK/NACK or CSI by performing a process such as, demodulation or channel decoding, for the PUCCH including Uplink Control Information (UCI). The PUSCH unit 1365 acquires uplink data transmitted by the UE 401 by performing a process such as, demodulation or channel decoding, for the PUSCH including uplink data of the UE 401. The receiver 1310 transmits output results of the PUCCH unit 1360 and the PUSCH unit 1365 to the scheduler 1320 and the carrier aggregation determiner 1330 to use them in performing a scheduling process and determining the carrier aggregation. For example, the aforementioned measurement report and RRC connection reconfiguration complete message of the UE 401 are received through the PUSCH, and the HARQ-ACK of the UE 401 for the Scell activation command transmitted through the PDSCH is received through the PUCCH.

The carrier aggregation determiner 1330 determines whether to perform the carrier aggregation with respect to the UE 401, which desires the scheduling in consideration of an amount of data to be transmitted to the UE 401 and an amount of available resources within the system. The carrier aggregation determiner 1330 informs the scheduler 1320, the transmitter 1300, the receiver 1310, and the second eNB 403 of a result thereof. For example, the transmission/reception of the Scell addition request message, the Scell addition request response message, the Scell activation request message, and the Scell activation request response message between the first eNB 402 and the second eNB 403 are managed by the carrier aggregation determiner 1330.

Figure 14:
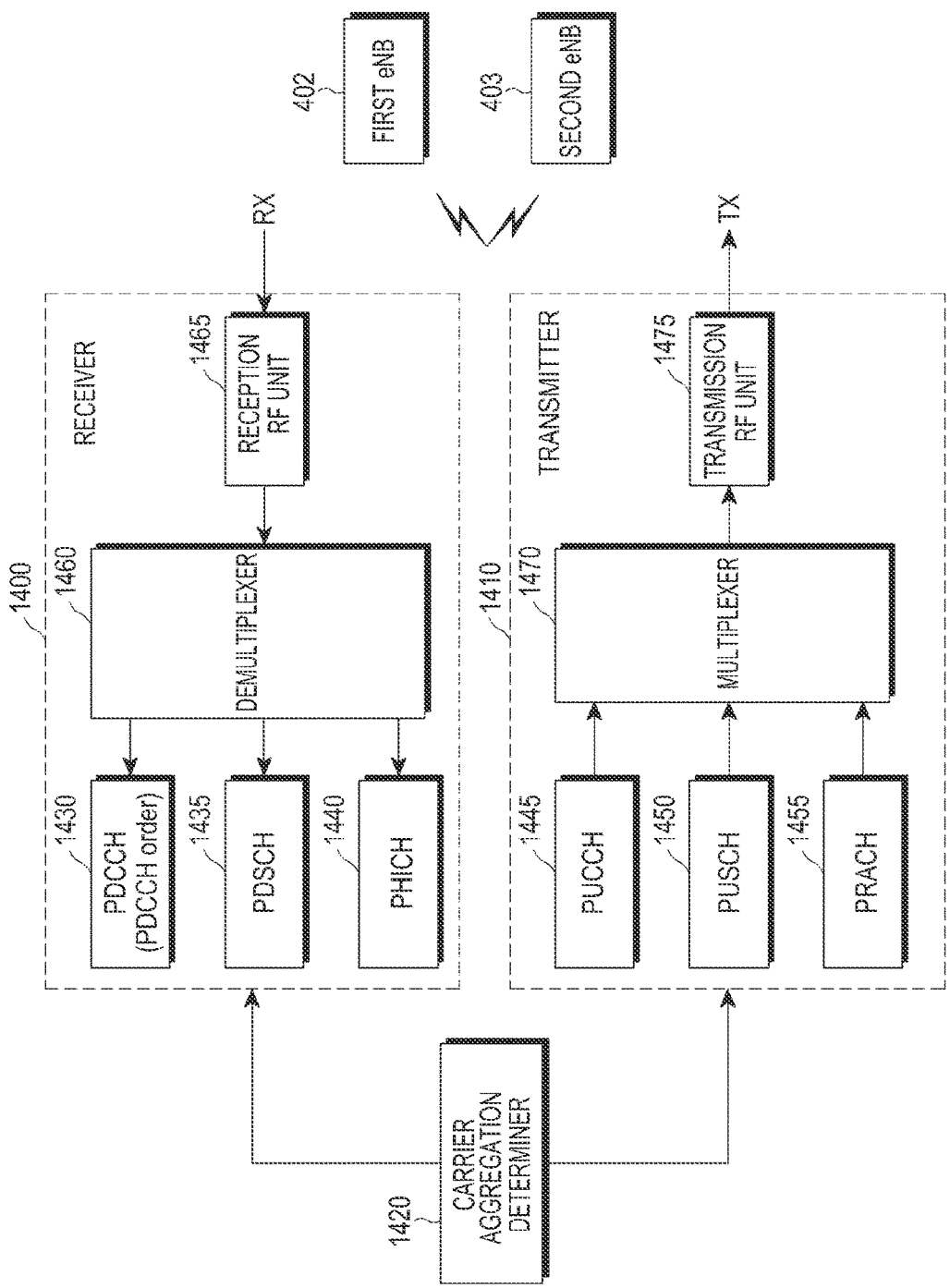
FIG. 14 is a diagram illustrating a configuration of a UE in an LTE-A system supporting carrier aggregation between different eNBs, according to an embodiment of the present invention.

FIG. 14 is a diagram illustrating a configuration of the UE in the LTE-A system supporting carrier aggregation between different eNBs, according to an embodiment of the present invention.

Referring to FIG. 14, the UE 401 includes a transmitter 1400, a receiver 1410, and a carrier aggregation determiner 1420.

The transmitter 1410 includes a PUCCH unit 1445, a PUSCH unit 1450, a PRACH unit 1455, a multiplexer 1470, and a transmission RF unit 1475. The receiver 1400 includes a PDCCH unit 1430, a PDSCH unit 1435, a PHICH unit 1440, a demultiplexer 1460, and a reception RF unit 1465.

The PDCCH unit 1430 acquires downlink control information by performing a process such as, demodulation or channel decoding, for the PDCCH received by the UE 401. The PDSCH unit 1435 acquires downlink data by performing a process such as, demodulation or channel decoding, for the PDSCH received by the UE 401. Further, the PHICH unit 1440 acquires HARQ-ACK/NACK information on uplink data transmitted by the UE 401 by performing a process such as, demodulation or channel decoding, for the PHICH received by the UE 401. For example, the UE 401 receives the aforementioned RRC connection reconfiguration message through the PDSCH, and the Scell activation command is configured by MAC signaling and received through the PDSCH or through a PDCCH order.

The PUCCH unit 1445 generates the PUCCH by performing a process such as, channel coding or modulation, for UCI including HARQ-ACK and CSI. The PUSCH unit 1450 generates the PUSCH by performing a process such as, channel coding or modulation, for uplink data. The PRACH unit 1455 configures a random access preamble to be transmitted by the UE 401.

The PUCCH, the PUSCH, and the random access preamble generated by the PUCCH unit 1445, the PUSCH unit 1450, and the PRACH unit 1455 are multiplexed by the multiplexer 1470, signal-processed by the transmission RF unit 1475, and then transmitted to the first or second eNB 402 or 403. For example, the UE 401 may transmit the aforementioned measurement report and RRC connection reconfiguration complete message through the PUSCH, and transmit the HARQ-ACK for the Scell activation command received from the first eNB 402 through the PUCCH. The first eNB 402 transmits the random access preamble in response to the Scell activation command transmitted through the PDCCH order.

The carrier aggregation determiner 1420 controls a carrier aggregation status of the UE 401 from control information received from the first or second eNB 402 or 403, and controls the receiver 1400 and the transmitter 1410.

While the invention has been described with reference to certain embodiments thereof, it will be understood by those skilled in the art that various changes in form and detail may be made therein without departing from the spirit and scope of the invention as defined by the appended claims.

What is claimed is:

1. A method of using a plurality of cells by an evolved nodeb (eNB) in a communication system, the method comprising:

determining, by a first eNB that manages a first cell and is providing a communication service to a user equipment (UE) located in the first cell, to provide the communication service to the UE together with a second cell of a second eNB, which neighbors the UE;

transmitting, by the first eNB, a cell addition request message, making a request for aggregation of the first cell and the second cell, to the second eNB to provide the communication service; and if a cell addition response message for accepting the request for aggregation of the first cell and the second cell is received by the first eNB from the second eNB, transmitting, by the first eNB, a cell activation request message, making a request for activation of the second cell, to the second eNB, wherein the cell addition response message comprises information indicating a time point when the UE applies an activation of the second cell.

2. The method of claim 1, wherein, when the cell addition response message is received from the second eNB, further comprising:

inserting related information required for aggregation of the first cell and the second cell in a radio resource control (RRC) connection reconfiguration message, and transmitting the RRC connection reconfiguration message to the UE; and receiving an RRC connection reconfiguration complete message, indicating that preparation for communication with the second cell has been completed, from the UE.

3. The method of claim 1, further comprising:

receiving a measurement report comprising at least one of a buffer status report and information on available transmission power, from the UE; and determining whether to activate the second cell based on the measurement report.

4. The method of claim 1, further comprising:

receiving a cell activation response message, accepting the request for activation of the second cell, from the second eNB;

transmitting an activation command of the second cell to the UE; and transmitting and receiving the communication service to and from the UE after a preset time point has passed from a time point when the activation command is transmitted.

5. The method of claim 1, further comprising:
transmitting an activation command of the second cell to the UE before the cell activation request message is transmitted; and
transmitting and receiving the communication service to and from the UE after the UE applies the activation of the second cell.

6. The method of claim 1, wherein, further comprising:
transmitting an activation command of the second cell to the UE; and
receiving a cell activation update message, informing that an activation of the second cell by the UE is applied, from the second eNB.

7. The method of claim 2, wherein the related information required for aggregation of the first cell and the second cell comprises at least one of downlink carrier bandwidth information of the second cell, antenna configuration information, uplink component carrier bandwidth and center frequency information, physical random access (PRACH) transmission related information, uplink power control related information, channel status indicator (CSI) transmission related information, sounding reference signal (SRS) transmission related information, downlink and uplink data transmission related information, and information on the time point.

8. A method of using a plurality of cells by an evolved nodeb (eNB) in a communication system, the method comprising:
receiving, by a second eNB, from a first eNB that manages a first cell and is providing a communication service to a user equipment (UE) located in the first cell, a cell addition request message, making a request for aggregation of the first cell and a second cell of the second eNB, which neighbors the UE, to provide the communication service;
transmitting, by the second eNB, a cell addition response message, accepting the request for aggregation of the first cell and the second cell, to the first eNB; and
receiving, by the second eNB, a cell activation request message, making a request for activation of the second cell, from the first eNB,
wherein the cell addition response message comprises information indicating a time point when the UE applies an activation of the second cell.

9. The method of claim 8, further comprising:
transmitting a cell activation response message, accepting the request for activation of the second cell, to the first eNB, such that the first eNB transmits an activation command of the second cell to the UE; and
transmitting and receiving the communication service to and from the UE after a preset time point has passed from a time point when the first eNB transmits the activation command.

10. The method of claim 8, further comprising:
transmitting and receiving the communication service to and from the UE after the UE applies the activation of the second cell.

11. The method of claim 8, wherein, after the cell addition response message is transmitted to the first eNB, further comprising:
receiving a random access preamble, making a request for a connection from the UE; and transmitting a random access response, accepting the request for the connection, and a cell activation update message, informing that the activation of the second cell by the UE is applied to the UE.

12. A method of using a plurality of cells by a User Equipment (UE) in a communication system, the method comprising:
if a first evolved nodeb (eNB), which manages a first cell and is providing a communication service to the UE located in the first cell, determines to provide the communication service to the UE together with a second cell of a second eNB, which neighbors the UE, resulting from the first eNB transmitting a cell addition request to the second eNB requesting aggregation of the first cell and the second cell and the first eNB receiving a cell addition response from the second eNB accepting the aggregation of the first cell and second cell and comprising information indicating a time point when the UE applies an activation of the second cell, receiving a radio resource control (RRC) connection reconfiguration message, comprising related information required for aggregation of the first cell and the second cell and information indicating the time point when the activation of the second cell is applied, from the first eNB;
transmitting an RRC connection reconfiguration complete message, indicating that preparation for communication with the second cell has been completed, to the first eNB; and
receiving an activation command of the second cell, from the first eNB.

13. The method of claim 12, further comprising transmitting a measurement report, comprising at least one of a buffer status report and information on available transmission power, to the first eNB, such that the first eNB determines whether to activate the second cell.

14. The method of claim 12, further comprising transmitting and receiving the communication service to and from the first eNB and the second eNB, after a preset time point has passed from a time point when the activation command is received.

15. The method of claim 12, further comprising, transmitting and receiving the communication service to and from the first eNB and the second eNB, after the time point.

16. The method of claim 12, further comprising;
transmitting a random access preamble, making a request for a connection to the second eNB;
receiving a random access response, accepting the request for the connection, from the second eNB; and
transmitting and receiving the communication service to and from the first eNB and the second eNB.

17. The method of claim 12, wherein the related information required for aggregation of the first cell and the second cell comprises at least one of downlink carrier bandwidth information of the second cell, antenna configuration information, uplink component carrier bandwidth and center frequency information, physical random access channel (PRACH) transmission related information, uplink power control related information, channel status indicator (CSI) transmission related information, sounding reference signal (SRS) transmission related information, downlink and uplink data transmission related information, and information on the time point.

18. An evolved nodeb (eNB) using a plurality of cells in a communication system, the eNB comprising:
a carrier aggregation determiner configured to determine that the eNB, which manages a first cell and is providing a communication service to a user equipment (UE) located in the first cell, to provide the communication service to the UE together with a second cell of a second eNB, which neighbors the UE; and a transmitter configured to transmit a cell addition request message, making a request for aggregation of the first cell and the second cell, to the second eNB to provide the communication service and, if a cell addition response message for accepting the request for aggregation of the first cell and the second cell is received from the second eNB, transmit a cell activation request message, making a request for activation of the second cell, to the second eNB, wherein the cell addition response message comprises information indicating a time point when the UE applies an activation of the second cell.

19. The eNB of claim 18, further comprising a receiver, wherein, when the cell addition response message is received from the second eNB, the transmitter inserts related information required for aggregation of the first cell and the second cell in a radio resource control (RRC) connection reconfiguration message and transmits the RRC connection reconfiguration message to the UE, and the receiver receives an RRC connection reconfiguration complete message, indicating that preparation for communication with the second cell has been completed, from the UE.

20. The eNB of claim 19, wherein the receiver receives a measurement report comprising at least one of a buffer status report and information on available transmission power, from the UE, and the carrier aggregation determiner determines whether to activate the second cell based on the measurement report.

21. The eNB of claim 19, wherein the receiver receives a cell activation response message, accepting the request for activation of the second cell, from the second eNB, the transmitter transmits an activation command of the second cell to the UE and transmits the communication service to the UE after a preset time point has passed from a time point when the activation command is transmitted, and the receiver receives the communication service.

22. The eNB of claim 19, wherein the transmitter transmits an activation command of the second cell to the UE before transmitting the cell activation request message and transmits the communication service to the UE after the UE applies the activation of the second cell, and wherein the receiver receives the communication service after the UE applies the activation of the second cell.

23. The eNB of claim 19, wherein the transmitter transmits an activation command of the second cell to the UE, and the receiver receives a cell activation update message indicating that an activation of the second cell by the UE is applied from the second eNB.

24. The eNB of claim 19, wherein the related information required for aggregation of the first cell and the second cell comprises at least one of downlink carrier bandwidth information of the second cell, antenna configuration information, uplink component carrier bandwidth and center frequency information, physical random access channel (PRACH) transmission related information, uplink power control related information, channel status indicator (CSI) transmission related information, sounding reference signal (SRS) transmission related information, downlink and uplink data transmission related information, and information on the time point.

25. An evolved nodeb (eNB) using a plurality of cells in a communication system, the eNB comprising:

a receiver configured to receive, from a first eNB that manages a first cell and is providing a communication service to a user equipment (UE) located in the first cell, a cell addition request message, making a request for aggregation of the first cell and a second cell of the eNB, which neighbors the UE, to provide the communication service, and receives a cell activation request message, making a request for activation the second cell, from the first eNB;

a carrier aggregation determiner that determines whether to accept the request for aggregation of the first cell and the second cell; and a transmitter that transmits a cell addition response message, accepting the request for aggregation of the first cell and the second cell, to the first eNB, wherein the cell addition response message comprises information indicating a time point when the UE applies an activation of the second cell.

26. The eNB of claim 25, wherein the transmitter transmits a cell activation response message, accepting the request for activation of the second cell, to the first eNB, such that the first eNB transmits an activation command of the second cell to the UE and transmits the communication service to the UE after a preset time point has passed from a time point when the first eNB transmits the activation command, and the receiver receives the communication service.

27. The eNB of claim 25, wherein the transmitter transmits the communication service to the UE after the UE applies activation of the second cell, and the receiver receives the communication service after the UE applies activation of the second cell.

28. The eNB of claim 25, wherein, after the cell addition response message is transmitted to the first eNB, the receiver receives a random access preamble, making a request for a connection from the UE, and the transmitter transmits a random access response accepting the request for the connection and a cell activation update message, informing that an activation of the second cell by the UE is applied to the UE.

29. A user equipment (UE) using a plurality of cells in a communication system, the UE comprising:

a receiver configured to, if a first evolved nodeb (eNB), which manages a first cell and is providing a communication service to the UE located in the first cell, determine to provide the communication service to the UE together with a second cell of a second eNB, which neighbors the UE, resulting from the first eNB transmitting a cell addition request to the second eNB requesting aggregation of the first cell and the second cell and the first eNB receiving a cell addition response from the second eNB accepting the aggregation of the first cell and second cell and comprising information indicating a time point when the UE applies an activation of the second cell, receive a radio resource control (RRC) connection reconfiguration message, comprising related information required for aggregation of the first cell and the second cell and information indicating the time point when the activation of the second cell is applied, from the first eNB, and receive an activation command of the second cell, from the first eNB; and a transmitter that transmits an RRC connection reconfiguration complete message, indicating that preparation for communication with the second cell has been completed, to the first eNB.

30. The UE of claim 29, wherein the transmitter transmits a measurement report, comprising at least one of a buffer status report and information on available transmission power, to the first eNB, such that the first eNB determines whether to activate the second cell.

31. The UE of claim 29, wherein the transmitter transmits the communication service to the first eNB and the second eNB after a preset time point has passed from a time point when the activation command is received, and the receiver receives the communication service.

32. The UE of claim 29, wherein the transmitter transmits the communication service to the first eNB and the second eNB after the time point, and the receiver receives the communication service from the first eNB and the second eNB after the time when the activation of the second cell is applied.

* * * * *